United States Patent
Miki et al.

(10) Patent No.: US 11,130,058 B2
(45) Date of Patent: Sep. 28, 2021

(54) GAME MACHINE AND STORAGE MEDIUM

(71) Applicant: KONAMI AMUSEMENT CO., LTD., Ichinomiya (JP)

(72) Inventors: Toru Miki, Ichinomiya (JP); Atsushi Usami, Ichinomiya (JP); Masahiro Kiyomoto, Ichinomiya (JP); Toyokazu Sakai, Ichinomiya (JP); Rei Takano, Ichinomiya (JP)

(73) Assignee: KONAMI AMUSEMENT CO., LTD., Ichinomiya (JP)

( * ) Notice: Subject to any disclaimer, the term of this patent is extended or adjusted under 35 U.S.C. 154(b) by 0 days.

(21) Appl. No.: 16/722,927

(22) Filed: Dec. 20, 2019

(65) Prior Publication Data
US 2020/0122034 A1 Apr. 23, 2020

Related U.S. Application Data

(63) Continuation of application No. PCT/JP2018/020792, filed on May 30, 2018.

(30) Foreign Application Priority Data

Jun. 27, 2017 (JP) .............................. JP2017-125350

(51) Int. Cl.
*A63F 13/44* (2014.01)
*A63F 13/213* (2014.01)
(Continued)

(52) U.S. Cl.
CPC ............ *A63F 13/44* (2014.09); *A63F 13/213* (2014.09); *A63F 13/428* (2014.09); *A63F 13/814* (2014.09)

(58) Field of Classification Search
None
See application file for complete search history.

(56) References Cited

U.S. PATENT DOCUMENTS 4,925,189 A * 5/1990 Braeunig ................. A63F 13/06
273/148 B
5,616,078 A * 4/1997 Oh ........................... A63F 13/06
463/8
(Continued)

FOREIGN PATENT DOCUMENTS

JP 2000-37490 A 2/2000
JP 2013-154123 A 8/2013
JP 2016-97016 A 5/2016

OTHER PUBLICATIONS

International Search Report dated Sep. 4, 2018 in International Application No. PCT/JP2018/020792.
(Continued)

*Primary Examiner* — Tramar Harper
(74) *Attorney, Agent, or Firm* — Sughrue Mion, PLLC

(57) ABSTRACT

The present invention provides a game machine that is capable of utilizing movements of at least a part of the body of the player as play actions. A game machine provides a dance game that advises of a performance timing at which an action constituting a dance is to be executed, and, evaluates the actual performance timing of that. The game machine includes a camera which detects either a crouching action that causes the head of a player to move lower than a lower-limit position or a return movement that causes the head to move higher than an upper-limit position. The game machine advises of a timing at which such crouching action or the like is to be executed so that the crouching action or the like function as the actions of the dance, and, when such crouching action or the like is detected, evaluates the actual timing of that.

20 Claims, 14 Drawing Sheets

(51) Int. Cl.
*A63F 13/428* (2014.01)
*A63F 13/814* (2014.01)

(56) References Cited

U.S. PATENT DOCUMENTS

| | | | | | |
|---|---|---|---|---|---|
| 6,450,888 | B1 * | 9/2002 | Takase | ................... | A63F 13/10 463/43 |
| 6,659,873 | B1 * | 12/2003 | Kitano | ................... | A63F 13/10 463/42 |
| 6,685,480 | B2 * | 2/2004 | Nishimoto | ......... | G09B 19/0015 434/247 |
| 2001/0004861 | A1 | 6/2001 | Suzuki et al. | | |
| 2002/0055383 | A1 * | 5/2002 | Onda | ................... | A63F 13/212 463/36 |
| 2002/0160823 | A1 * | 10/2002 | Watabe | ................... | A63F 13/46 463/7 |
| 2003/0109298 | A1 * | 6/2003 | Oishi | ................... | A63F 13/08 463/8 |
| 2004/0009814 | A1 * | 1/2004 | Kim | ................... | A63F 13/213 463/36 |
| 2010/0151948 | A1 * | 6/2010 | Vance | ................... | A63F 13/10 463/43 |
| 2010/0238182 | A1 * | 9/2010 | Geisner | ................... | G06T 13/00 345/474 |
| 2010/0278393 | A1 * | 11/2010 | Snook | ................ | G06K 9/00335 382/107 |
| 2011/0034300 | A1 * | 2/2011 | Hall | ................... | A63B 5/11 482/1 |
| 2011/0183765 | A1 * | 7/2011 | Kobayashi | ............ | A63F 13/428 463/43 |
| 2012/0108305 | A1 * | 5/2012 | Akiyama | ................ | A63F 13/67 463/7 |
| 2012/0108334 | A1 * | 5/2012 | Tarama | ................ | A63F 13/814 463/36 |
| 2012/0116258 | A1 * | 5/2012 | Lee | ................... | A61B 5/1071 600/595 |
| 2012/0157203 | A1 * | 6/2012 | Latta | ................... | G06T 13/40 463/32 |
| 2012/0295705 | A1 * | 11/2012 | Hanawa | ................ | A63F 13/44 463/31 |
| 2013/0194182 | A1 * | 8/2013 | Tarama | ............... | A63F 13/5375 345/158 |
| 2015/0352441 | A1 * | 12/2015 | Lin | ................... | A63F 13/214 463/36 |
| 2020/0064908 | A1 * | 2/2020 | Boucher | ................ | A63F 13/212 |

OTHER PUBLICATIONS

Written Opinion of the International Searching Authority dated Sep. 4, 2018 in International Application No. PCT/JP2018/020792.
Office Action dated Aug. 21, 2018 in Japanese Application No. 2017-125350.
Office Action dated Mar. 25, 2019 in Japanese Application No. 2017-125350.
Communication dated Jul. 16, 2021 by the Korean Patent Office in application No. 10-2019-7037795.

* cited by examiner

GAME MACHINE AND STORAGE MEDIUM

TECHNICAL FIELD

The present invention relates to a game machine and so on that provides a timing game in which a performance timing at which a play action is to be executed is advised, and which, when the play action has actually been executed, evaluates the actual performance timing of the play action on the basis of the performance timing.

BACKGROUND ART

A game machine is per se known that provides a timing game in which a performance timing at which a play action is to be executed is advised, and which, when the play action has actually been executed, evaluates the actual performance timing of the play action on the basis of the performance timing. As one such timing game, there is also known a music game in which advice is given as to play actions to be matched to the rhythm of a musical piece that is replayed during the game, and the actual timings of those play actions are evaluated. For example, a music game is per se known (for example, refer to PTL1) in which, by employing an action like the player stepping downward as such a play action, advice is given, along with the progression of a musical piece during the game, as to the position of the input unit upon which the player should step, so that the player executes steps in a dance matched to the music, and the positions and timings of these steps are evaluated.

CITATION LIST

Patent Literature

PTL1: Japanese Laid-Open Patent Publication 2000-037490.

SUMMARY OF INVENTION

Technical Problem

With the music game of PTL1, movements of the lower half of the body of the player for executing steps in the dance are commanded as play actions, and are evaluated. On the other hand, in some cases a dance may include movements of the upper half of the body of the dancer. Therefore, there is room for enhancing the level of interest in the game by employing movements of the upper half of the body of the player as play actions of this type. On the other hand, since the upper half of the body of the player moves in conjunction with the movement of his/her lower body half and is basically never stationary, accordingly it is not easy to specify the movements of the upper body half of the player that are to be employed as play actions. And this type of tendency is not limited to occurring in connection with the upper half of the body of the player, but also can occur when trying to employ the movements of other parts of his/her body as play actions.

Accordingly, an object of the present invention is to provide a game machine and so on that are capable of utilizing movements of at least a part of the body of the player as play actions.

Solution to Technical Problem

The game machine of the present invention is a game machine comprising a computer that provides a performance timing game in which an advised timing at which a play action is to be executed is advised, and that, when the play action is actually executed, evaluates an actual performance timing of the play action on the basis of the performance timing, wherein the computer serves as: a detection device that detects a shifting action in which at least a part of the body of a player is shifted in a predetermined direction past a threshold position; an advisory device that, as the performance timing, advises a timing at which the shifting action is to be executed, so that the shifting action functions as the play action; and an evaluation device that, when the shifting action has been detected via the detection device, evaluates an actual timing at which the shifting action has been executed as the actual advised timing.

On the other hand, a non-transitory computer readable storage medium of the present invention is a non-transitory computer readable storage medium storing a computer program that is adapted to cause the computer connected to the detection device to function as devices of the game machine described above.

DESCRIPTION OF EMBODIMENTS

Figure 1:
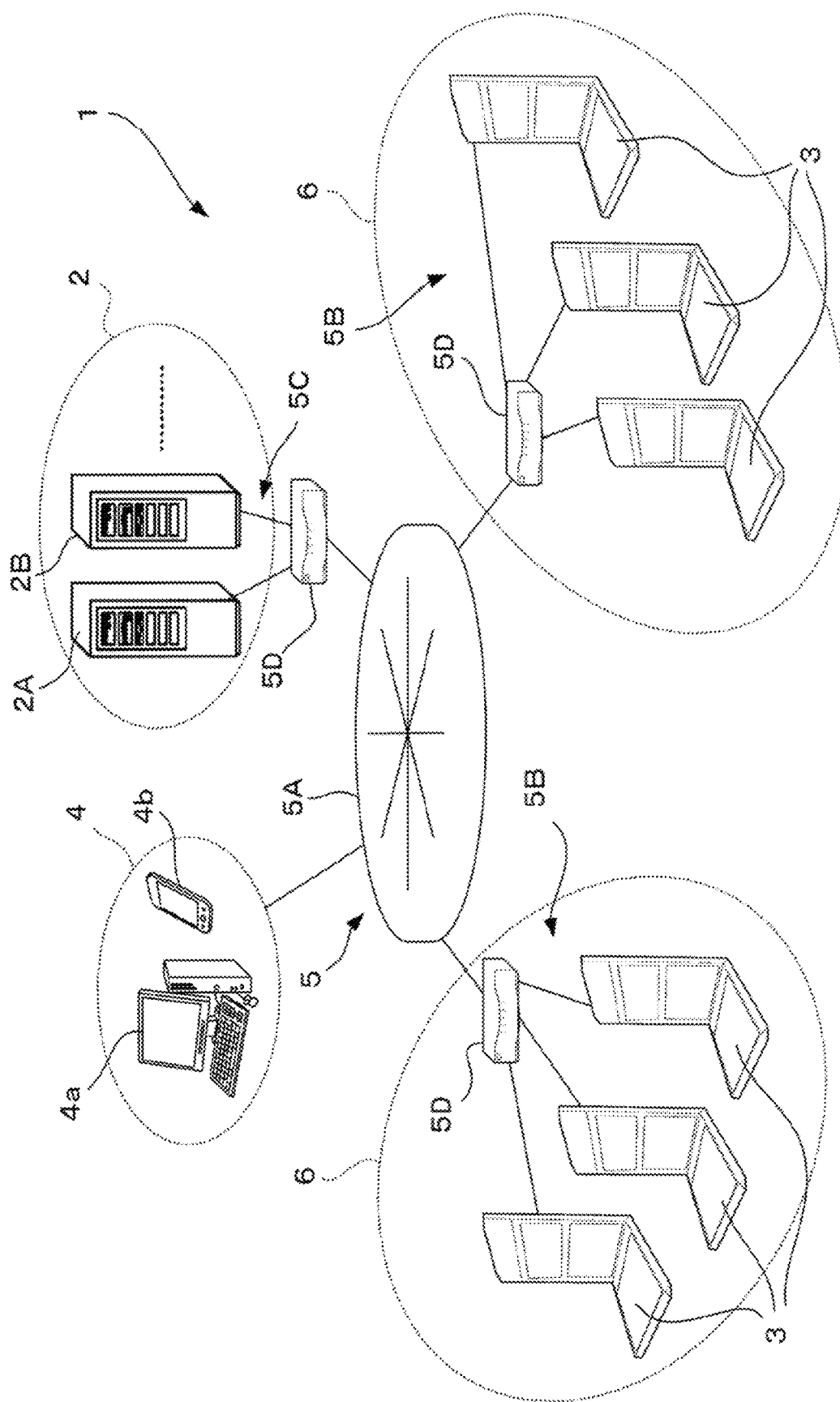
FIG. 1 is a figure showing an example of a game system including a game machine according to an embodiment of the present invention.

An example of a game system that includes a game machine according to an embodiment of the present invention will now be explained. First, the overall structure of the game system will be explained with reference to FIG. 1. The game system 1 includes a center server 2 that serves as a server device, and a plurality of game machines 3 and a plurality of user terminal devices 4 that serve as client devices and that can be connected to the center server 2 via a predetermined network 5. The term "user" is a generic term for a person who utilizes the game system 1, and sometimes a user who plays a game on a game machine 3 may herein be termed a "player". The center server 2 is built as a single logical server device by combining server units 2A, 2B that function as a plurality of computer devices. However, it would also be possible for the center server 2 to be built as a single server unit. Alternatively, the center server 2 may also be built logically by employing cloud computing.

Each of the game machines 3 is built as a commercial game machine (for business use) that, in exchange for payment of a predetermined playing fee, allows users to play a game within a range that corresponds to that playing fee. This type of game machine 3 is sometimes called an arcade game machine. The game machine 3 is a computer device that is installed in a predetermined facility such as a shop 6 or the like, with the primary objecting of increasing profits by enabling a large number of users to play a game repeatedly. The game machine 3 is built as a dance game machine for playing a dance game in which, as play actions, the player is commanded to perform actions of various types that constitute a dance, for example steps that are to be enacted in a predetermined sequence in time to music, and the actions that the player has actually performed in response to those commands are evaluated. A dance game is a type of music game in which various actions (steps and so on) that constitute a dance and that match the rhythm of music are requested as play actions. Moreover, a music game is a type of timing game in which the player is advised as to the performance timings of play actions, and in which the actual performance timings of the actions performed by the player are evaluated on the basis of these performance timings.

Each of the user terminal devices 4 is a computer device that can be connected to the network and that is applied to personal use by a user. For example, a desktop type or notebook type personal computer 4a (hereinafter referred to as a "PC") or a mobile terminal device such as a portable telephone (including a smart phone) may be employed as a user terminal device 4. Apart from the above, computer devices of various types that can be connected to the network and that are applied to personal use, such as desktop type game machines for household use, portable type game machines, or portable type tablet terminal devices, may also be employed as user terminal devices 4. By software of various types being implemented, a user terminal device 4 can enable the user to enjoy services of various types supplied by the center server 2.

The network 5 may have any appropriate structure, provided that it is capable of connecting the game machines 3 and the user terminal devices 4 to the center server 2. For example, the network 5 may be implemented to perform network communication by employing the TCP/IP protocol. Typically, the network is built up by the internet 5A that serves as a WAN and LANs 5B and 5C that connect the center server 2 and each of various game machines 3 to the internet 5A being connected via routers 5D. The user terminal devices 4 are also connected to the internet 5A by appropriate equipment. It would also be possible for a local server to be installed between one or more game machines 3 and a router 5D of a shop 6, so that the game machines 3 are connected so as to be capable of communication with the center server 2 via this local server. In some cases, the server units 2A, 2B, . . . of the center server 2 may be connected to one another by the WAN 5A, instead of or as well as by the LAN 5C.

Figure 2:
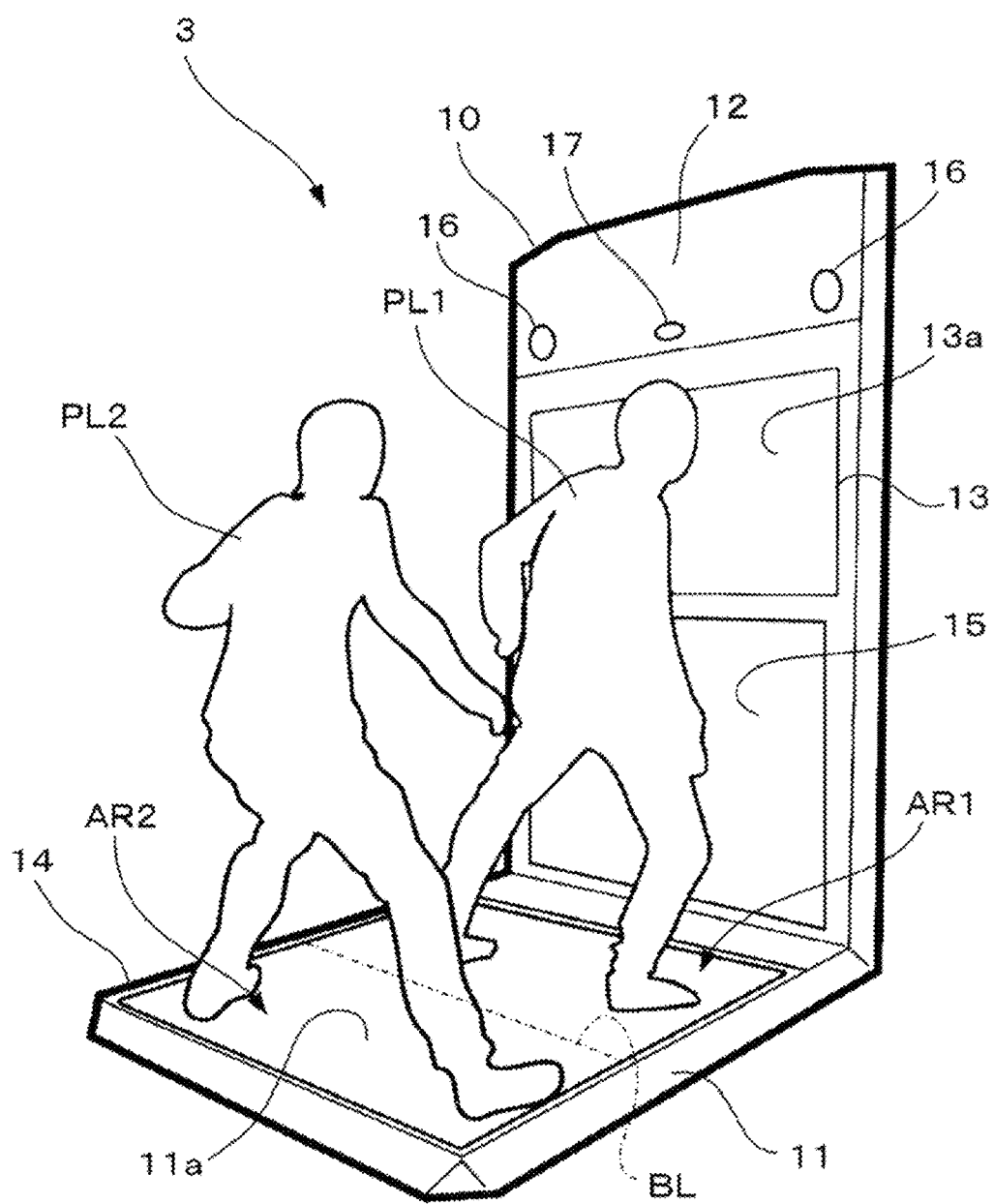
FIG. 2 is a figure showing the structure of the game machine.

Next, the structure of one of the game machines 3 will be explained with reference to FIGS. 2 and 3. FIG. 2 shows an example of a single game machine 3. The game machine 3 of the shown example has a casing 10. The casing 10 is built to have an overall external shape approximately in the form of a letter L, and includes a stage 11 that is installed upon a horizontal surface where the game machine 3 is to be set up, such as the surface of a floor in a facility such as a shop 6 or the like, and a standing wall 12 that extends generally vertically from the end portion of the stage 11. A display device 13 is mounted upon the front upper portion of the standing wall 12 so that its display surface 13a faces toward the stage 11. As one example, the display device 13 may be a flat panel display such as a liquid crystal display or the like. The direction of the display device 13 orthogonal to the display surface 13a is the longitudinal (front and rear) direction of the game machine 3, the direction in a horizontal plane orthogonal to this longitudinal direction is the transverse (left and right) direction of the game machine 3, and the direction orthogonal to both this longitudinal direction and this transverse direction is the vertical direction of the game machine 3. However, in relation to the front, rear, left, and right of the game machine 3, it will be supposed that the front side, the rear side, the right side, and the left side are defined by taking as reference the state in which the game machine 3 is viewed facing the display surface 13a. For example, the side facing toward the display surface 13a is the front side, and the side away from the display surface 13a is the rear side.

As one example, the stage 11 may be formed in the shape of a flat plate that is generally rectangular, with its longitudinal direction being the longer. The upper surface of the stage 11 is built as a treading surface 11a that is of a size sufficient for it to be possible for two players PL1, PL2 (sometimes represented by "PL") to tread out dance steps while being lined up along the longitudinal direction of the game machine 3. Corresponding to the arrangement in which the two players PL are lined up in the longitudinal direction, two play regions AR1, AR2 (sometimes represented by "AR") are set on the treading surface 11a of the stage 11, so as to bisect the treading surface 11a in the longitudinal direction. In FIG. 2, the position of the boundary between the play regions AR1, AR2 is shown by a single dotted chain line BL.

Each of the play regions AR is set as a range in which one of the players PL treads out dance steps. The two play regions AR are of the same shape and size. The size of each of the play regions AR may be set as appropriate according to the age group, range of physique, and so on of the player PL who is assumed to be the subject of the dance game. As one example, in the case of providing a dance game for which an adult player PL is taken to be the subject, if the dance game is set up so that a player PL in one of the play regions AR executes steps by changing his/her position in the transverse direction, and change of his/her stepping position in the longitudinal direction is not considered, then the size of each of the play regions AR may be set to be approximately 0.5 m or more in the longitudinal direction. In this case, in relation to the size in the transverse direction, this may be set as appropriate, according to how much the stepping position changes. On the other hand, when setting up a game machine 3 for which a child is considered to be the subject, the play region AR may be set to be smaller than the range described above. However, the sizes of the play regions AR are not limited to the above examples; they may be built of appropriate sizes, according to what type of player PL the dance game is targeting and what type of dance moves will be demanded from the player PL. Furthermore, a stage sensor 14 is provided to the stage 11 that outputs a signal according to the actual treading position, which is the position where the player PL is actually treading on its treading surface 11a. The stage sensor 14 will be described hereinafter.

The display surface 13a of the display device 13 may be disposed at the same level as the line of sight of a player PL who is standing upon the treading surface 11a and is looking horizontally forward. The height of the line of sight of the player PL changes according to the age group and the physical structure of the player PL, but here it will suffice if the height of the display surface 13a is set so that a player PL of the age group targeted by the dance game is easily capable of viewing an image upon the display surface 13a.

A mirror 15 is attached to the standing wall 12 of the casing 10 so as to be positioned below the display device 13. The mirror 15 is arranged so as to face the chest portion of a player PL who is standing facing the display surface 13a, or a portion lower than his abdomen. Accordingly, a player PL1 who is positioned upon the play region AR1 at the front side of the stage 11 is able, using the mirror 15, visually to check what type of steps the player PL2 who is positioned upon the play region at the rear side is executing.

Furthermore, a speaker device 16 for replaying dance music and sound effects of games and so on and a camera 17 for photographing a player PL upon the treading surface 11a of the stage 11 are provided upon the standing wall 12 of the casing 10. The camera 17 is capable of video photography, and acquires dance video images during the game in which the postures of the player PL who is dancing are photographed. The camera 17 is disposed above the display device 13 and at its approximate center in the transverse direction, so as to photograph the player PL slantingly from in front and above. It would also be possible to attach a plurality of cameras 17 to the standing wall 12, in order to photograph the player PL from a plurality of points of view. Alternatively, a frame-like structure may be provided around the stage 11, and a camera 17 may be provided upon that structure for photographing the player PL from the side or from the rear.

Figure 3:
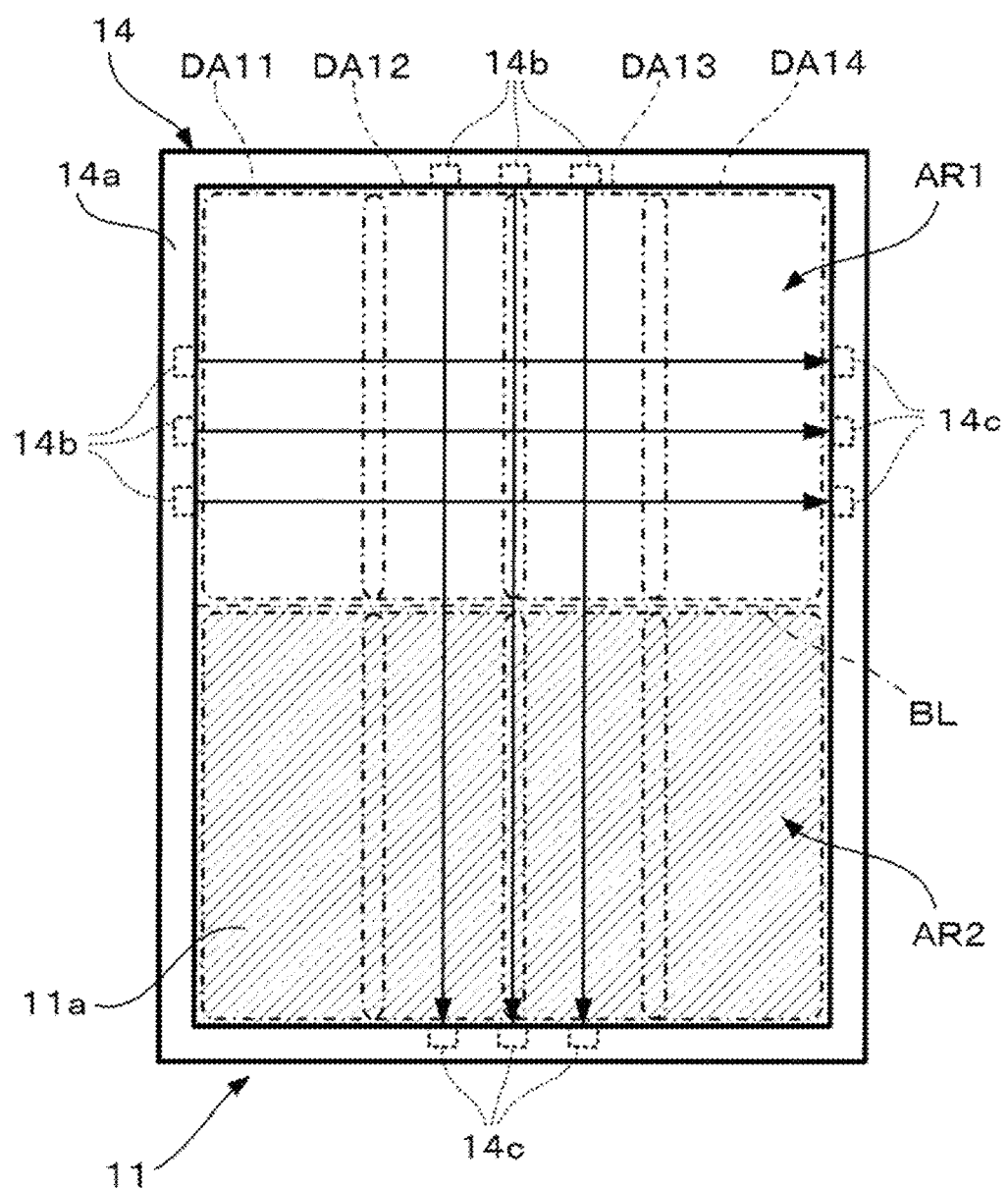
FIG. 3 is a figure showing a stage sensor.

FIG. 3 shows an example of the stage sensor 14. The stage sensor has a frame 14a that is rectangular in shape and that surrounds the periphery of the treading surface 11a of the stage 11. A plurality of light emission portions 14b that emit infrared light serving as an example of scanning light which is focused into the form of beams, are provided at a predetermined pitch (spacing interval) along one long side (the left side in FIG. 3) and along one short side (the upper side in FIG. 3) of the frame 14a, and light reception portions 14c which receive the infrared light emitted from the corresponding light emission portions 14b are provided at the same pitch as the light emission portions 14b, along the other long side and the other short side. In FIG. 3, only some of the light emission portions 14b and the light reception portions 14c are shown, but actually the light emission portions 14b and the light reception portions 14c are provided at a constant pitch from one end of the long side direction of the frame 14a to the other end, and from one end of the short side direction thereof to the other end. The direction of emission of infrared light from the light emission portions 14b that are provided upon the long edge of the frame 14a is parallel to the short side direction of the frame 14a, and the infrared light beams from those light emission portions 14b are incident upon the light reception portions 14c that oppose them along the short side direction. Moreover, the direction of emission of infrared light from the light emission portions 14b that are provided upon the short edge of the frame 14a is parallel to the long side direction of the frame 14a, and the infrared light beams from those light emission portions 14b are incident upon the light reception portions 14c that oppose them along the long side direction. Accordingly, the space above the treading surface 11a of the stage 11 is scanned vertically and horizontally by infrared light beams in a grid pattern.

The light reception portions 14c output different signals, depending upon whether or not they detect infrared light. As one example, the light reception portions 14c may output ON signals when they detect infrared light, and may output OFF signals when they do not detect infrared light. When a player PL steps in any position upon the treading surface 11a, incidence of infrared light upon some of the light reception portions 14c is impeded due to the foot of this player PL. Accordingly, it is possible to detect in which position the player PL is stepping upon the treading surface 11a by determining which of the output signals from the light reception portions 14c are ON and which are OFF. Incidentally, the pitches of the light emission portions 14b and of the light reception portions 14c may be set as appropriate, according to the resolving power related to detection of the positions of the feet of the player PL, in other words according to the accuracy with which it is necessary to detect the position of his/her feet. The pitch of the light emission portions 14b and the light reception portions 14c along the long side direction of the frame 14a and the pitch of the light emission portions 14b and the light reception portions 14c along the short side direction of the frame 14a may be the same, or may be different.

As described above, the two play regions AR1, AR2 that sandwich the boundary line BL are set upon the treading surface 11a of the stage 11 so as to bisect the stage 11 in the longitudinal direction (the vertical direction in FIG. 3). In FIG. 3, the play region AR2 at the rear side of the stage 11 is shown by hatching. Furthermore, in each of the play regions AR, a plurality of determination regions DA (four in the example shown in the figure) are set at positions spaced apart in the transverse direction. Accordingly, a total of eight determination regions DA are set upon the treading surface 11a. In FIG. 3 the determination regions DA in the play region AR1 at the front side are distinguished from one another by the reference symbols DA11, DA12, DA13, and DA14 being appended to them in order from the left, and the determination regions DA in the play region AR2 at the rear side are distinguished from one another by the reference symbols DA21, DA22, DA23, and DA24 being appended to them in order from the left, but, if they are not to be distinguished from one another, then they will be referred to as "determination regions DA". The determination regions DA are regions that are units for commanding the player PL where to tread, and moreover are regions that are units for determining whether or not his/her actual treading position is appropriate. In other words, a command is issued by the game machine 3 to the player PL for ordering him/her to tread upon the treading surface 11a in anyone of the determination regions DA, and it is determined whether or not the player PL has executed treading in an appropriate manner in response to the command, by detecting whether or not operation by the player to tread in the determination region DA that was commanded or operation to lift up his/her foot from that region has been performed.

Unique sensor numbers are assigned to each of the light reception portions 14*c*, and data for associating the sensor numbers with the determination regions DA is provided to the control unit 20 in advance. Accordingly, by acquiring the sensor numbers of the light reception portions 14*c* that are outputting OFF signals, the control unit 20 is able to determine to which of the determination regions DA the position where the player PL is treading upon the treading surface 11*a* belongs. It would be possible for the external boundaries of the determination regions DA to be set so as mutually to overlap one another, or for their external boundaries to be set so that they touch one another. Alternatively, some gaps might be set between the determination regions DA. Furthermore, it is not necessary to provide an arrangement of the light emission portions 14*b* such that, in each of the play regions AR1, AR2, infrared light passes through only one signal determination region DA. In a case in which overlapping of the determination regions DA with one another is allowed, it would be possible to provide an arrangement of some of the light emission portions 14*b* such that infrared light passes through such overlapped portions. A foot of a player PL that is to be a subject of detection has a certain size, and, when the player PL is commanded to tread in any one of the determination regions DA, it is rather harsh to demand exact treading such that the foot of the player does not enter into any determination region DA other than the determination region DA that has thus been commanded. Due to this, with this game machine 3, it is decided that treading according to the command has been performed, provided that treading in the determination region DA that has been commanded is detected. Accordingly, overlapping of parts of the determination regions DA, and arrangement of the light emission portions 14*b* such that their infrared beams pass through these overlapped portions, are both permitted.

The play regions AR, AR2 and the determination regions DA may be explicitly visually distinguished upon the treading surface 11*a* so that the players PL can recognize them by sight, or may not be explicitly shown in this manner. As the scanning light, the stage sensor 14 may employ light in a wavelength region other than infrared light, for example visible light.

Figure 4:
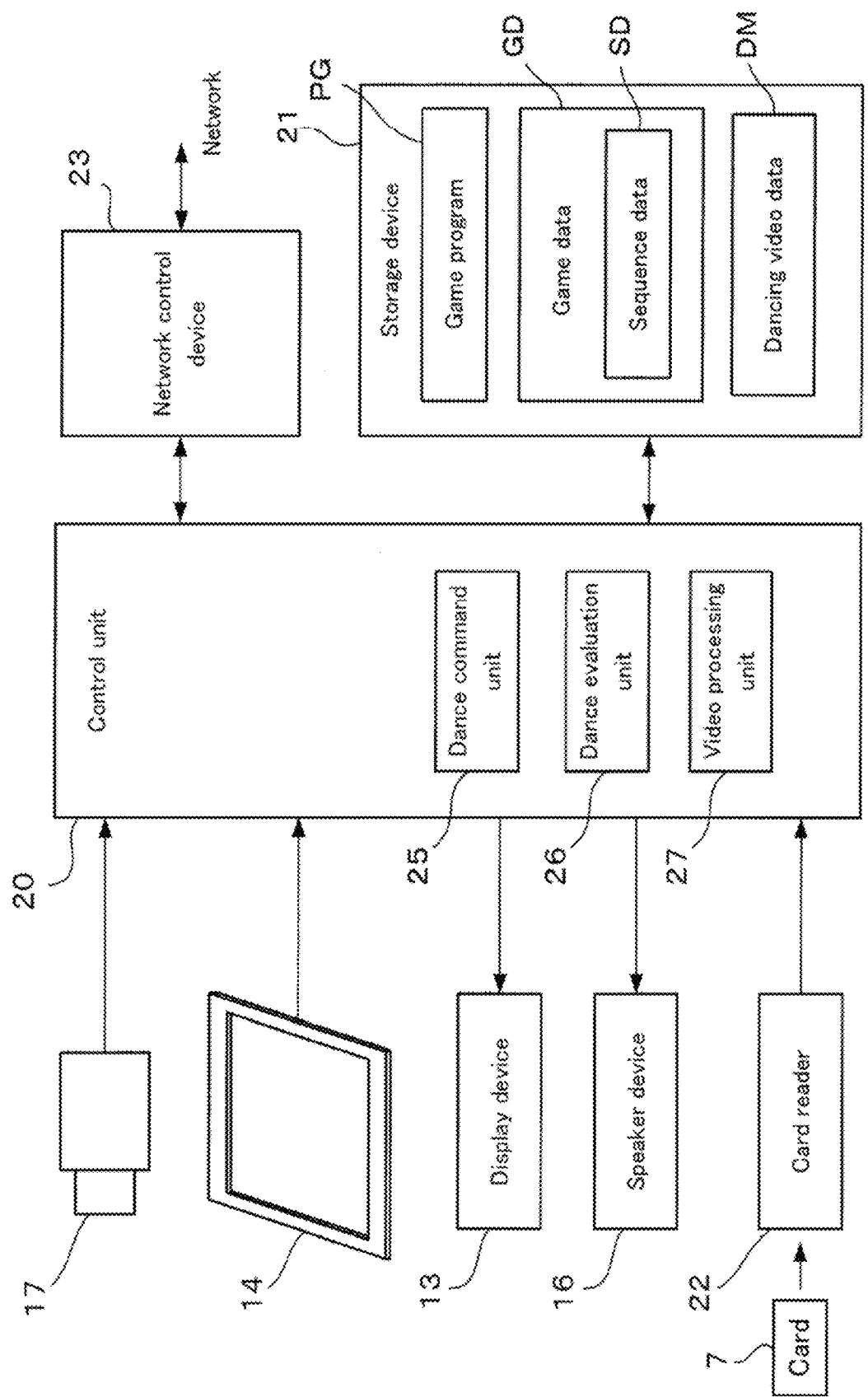
FIG. 4 is a functional block diagram showing principal portions of a control system of the game machine.

Next, the structure of the control system of the game machine 3 will be explained with reference to FIGS. 4 and 5. FIG. 4 shows the structure of principal portions of the control system of the game machine 3. The game machine 3 is provided with a control unit 20 and a storage device 21 (i.e. a storage means). The control unit 20 is built as a computer in which a microprocessor and internal storage devices (such as ROM and RAM) and so on that are required for the operation of that microprocessor are combined. The storage device 21 is a non-volatile storage device that is capable of maintaining storage, such as for example a hard disk storage device or a flash memory. The storage device 21 stores a game program PG that is executed by the control unit 20 and game data GD needed by that program PG for reference.

The game program PG is an application program that runs on the operating system of the game machine 3 for causing the game machine 3 to function as a dance game machine on which it is possible to play a predetermined dance game. The game data GD includes data of various types such as image data that is required for drawing game screens according to the game program PG, musical piece data that is required for replaying musical pieces upon which dance games are based, and so on. And the game data GD includes sequence data SD. The sequence data SD is data in which, for each musical piece, actions are described such as a series of steps and so on that are to be commanded to the players, matched to the musical piece that is to be replayed during the game. The contents of the sequence data SD will be described hereinafter. Furthermore, dancing video data DM is also stored in the storage device 21, according to requirements. Such dancing video data DM is video data in which dancing video imagery of a player that has been photographed by the camera 17 during play of the dance game is stored in a predetermined format.

In addition to the stage sensor 14 and the camera 17 shown in FIG. 2, also a card reader 22 is provided to the game machine 3 as an input device for the control unit 20. The card reader 22 reads in predetermined information from a card 7 that the user possesses, and supplies this information to the control unit 20. The card 7 includes a storage medium upon which is recorded a card ID that is unique for each card. The card ID is employed, for example, as identification information when, on the center server 2, recorded play data such as history of games played by the user upon the game machine 3 and so on, is stored, or when play data is being acquired from the center server 2 to the game machine 3. Furthermore, the display device 13 and the speaker device 16 shown in FIG. 2 are provided to the game machine 3 as output devices for the control unit 20. Yet further, a network control device 23 is connected to the control unit 20. The network control device 23 is a communication control unit that connects the control unit 20 to the network 5, and that controls processing required for establishing a communication procedure when communicating with the center server 2 or with another game machine 3, and for transmission and reception of data.

As logical devices that are implemented by a combination of hardware resources of the control unit 20 and the game program PG that serves as software, the control unit 20 includes a dance command unit 25, a dance evaluation unit 26, and a video processing unit 27. On the basis of the sequence data SD, the dance command unit 25 displays on the display surface 13*a* of the display device 13 guidance images commanding a series of dance actions that are to be performed during the dance game by the players PL1, PL2 respectively. The dance command unit 25 commands dance actions by the players PL on the basis of the sequence data SD while distinguishing between the play regions AR1, AR2. Commands for positions where the players PL should tread upon the treading surface 11*a* (i.e. treading positions) during the dance game are included in the commands issued by the dance command unit 25. The positions that are indicated change as appropriate within each of the play regions AR according to the progression of the musical piece, and the treading positions for the players PL are commanded while distinguishing between each of the play regions AR. The dance evaluation unit 26 functions as one example of an evaluation device that evaluates the players PL on the basis of comparison between the pattern in which the treading positions are commanded by the dance command unit 25 and the pattern in which the actual treading positions are detected by the stage sensor 14. As one example, the dance evaluation unit 26 performs evaluation on the basis of comparison between the time points and the determination regions according to which a series of actions in the dance are described in the sequence data SD (i.e. at performance timings), and the results of detection by the stage sensor 14 of the time points (i.e. the actual performance timings) and the positions of the actual dance actions. The evaluation technique will be described hereinafter.

The video processing unit 27 stores dancing video imagery acquired by the camera 1 during play of the game in the storage device 21 as appropriate, or transmits it to the network 5 via the network control device 23 as appropriate. The recipient of such dancing video imagery may be selected as appropriate from the center server 2, the other game machines 3, and the user terminal devices 4. By the dancing video imagery being immediately distributed to a game machine 3 or to a user terminal device 4, or being distributed at some appropriate timing, it is possible for the users of the game system 1 to view dancing video imagery relating to other people. Alternatively, the user is also able to check his/her own dancing video imagery via a user terminal device 4 or the like.

Figure 5:
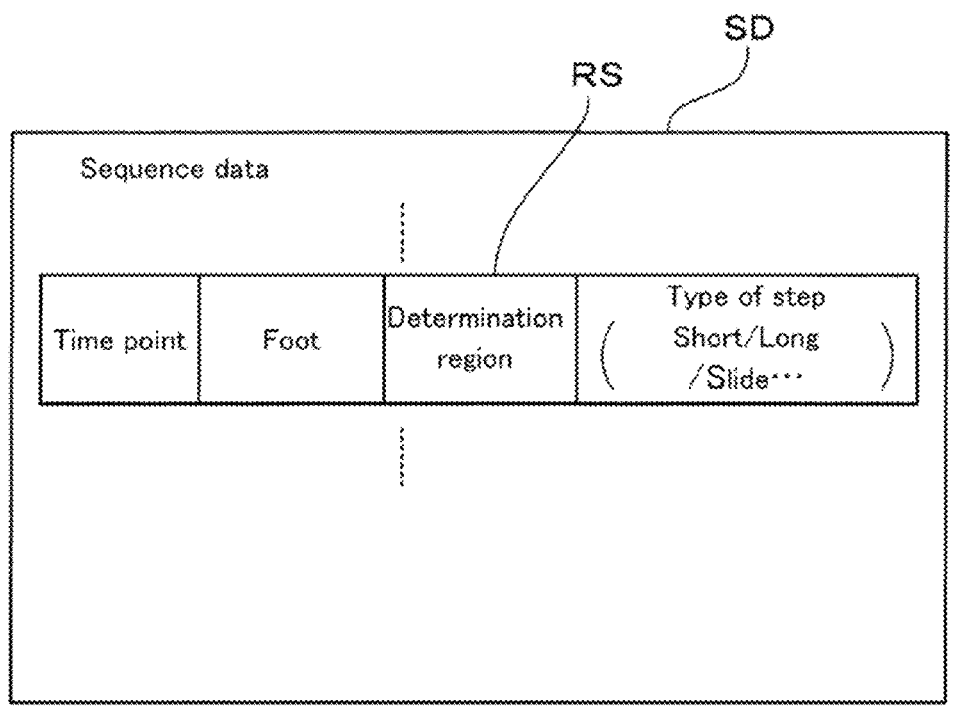
FIG. 5 is a figure showing an example of a structure of sequence data.

FIG. 5 shows an example of the structure of the sequence data SD. The sequence data SD is a set of records in which are described actions such as steps or the like that are to be performed by the player or players PL during play of the dance game. The sequence data SD includes a step record RS that specifies the steps to be performed by the player PL during play. Information specifying the time point at which each step should be performed, information specifying with which foot the player PL should perform the step, information specifying the determination region DA in which the step should be performed, and information specifying the type of the step are recorded in this step record RS in mutual association with one another. The time point information may, as one example, be information that specifies the elapsed time from the start of replay of the musical piece that is being reproduced in the dance game, or information that specifies the position in the musical piece. The information specifying the foot is information that specifies with which one of the right foot and the left foot the player PL is to perform the step. And the information for the determination region DA is information specifying one of the eight determination regions DA shown in FIG. 3.

Moreover, the information for specifying the type of step is information that specifies the step that the player PL must perform, from among steps of a plurality of types. Examples of step types include a short step in which the player takes one step, a long step in which he/she keeps his/her foot stationary in a predetermined position for a predetermined time duration, and a slide in which he/she moves his/her foot between a plurality of determination regions DA. Furthermore, the types of steps also include actions of the upper body half of the player, such as a crouching action or a diving under movement or the like. A diving under movement is a combination of a crouching action and a return movement for returning to the initial attitude. The details will be described hereinafter. In the step record RS that corresponds to a long step, the time point at which the step should start and the time point at which the step should end (i.e. the continuous time period that the foot should continue to remain in place) are specified. And, in the step record RS that corresponds to a slide, along with the time point at which the step should start and the time point at which it should end being specified, also the determination region DA in which the slide should start and the determination region DA in which the slide should end are specified. In a similar manner, in the step record RS that corresponds to a diving under movement, the time point at which the crouching action should start and the time point at which the return movement should be executed (i.e. the continuous time period during which the crouching attitude should be continued) are specified (if the return movement is not evaluated, the continuous time period could also be specified directly). Furthermore, if the return movement is evaluated separately from the crouching action, then a step record RS commanding the return movement is provided separately. In this case, the time period for continuation of the crouching attitude in the diving under movement functions as an example of the operating interval of the present invention.

Figure 6:
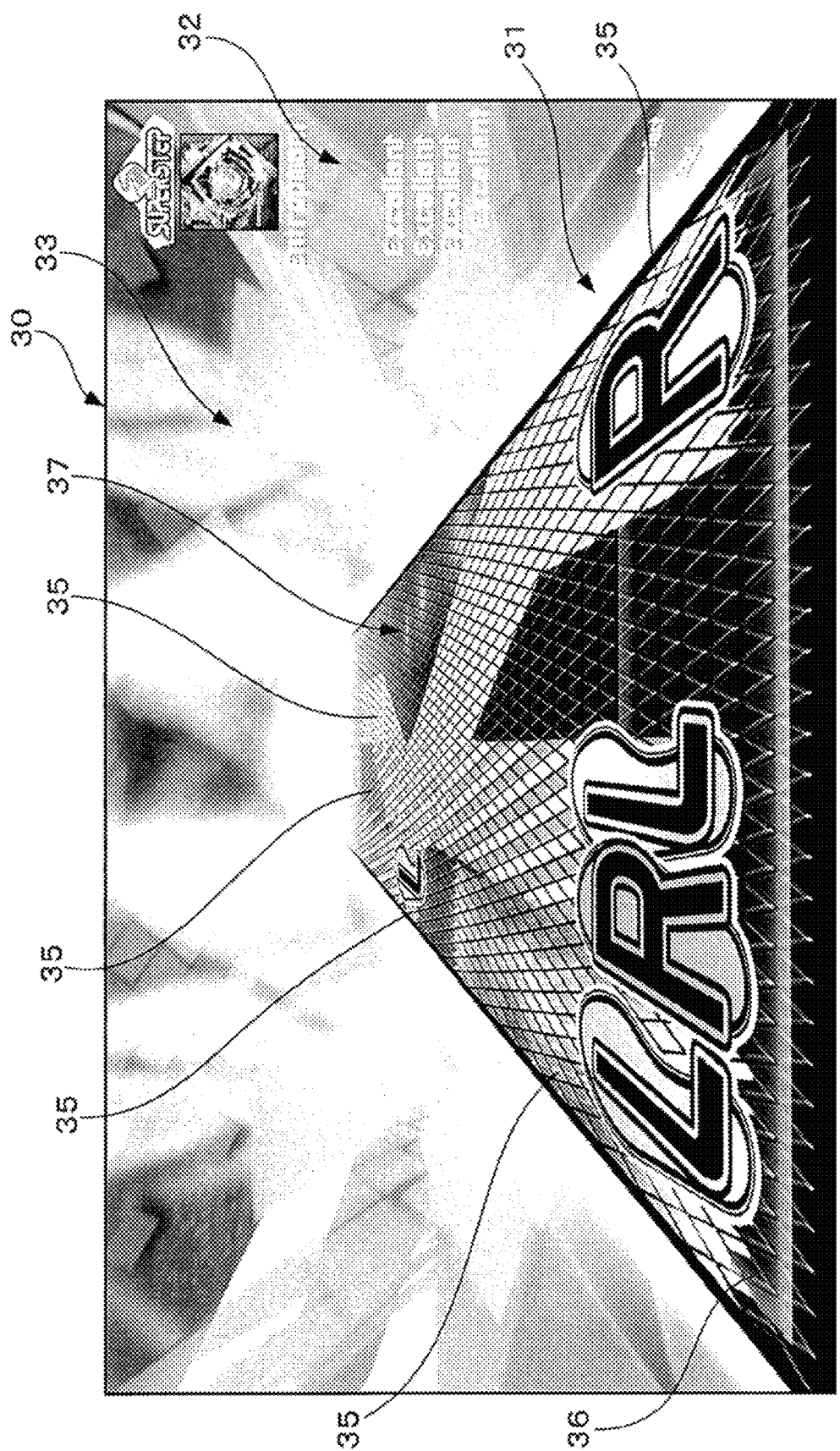
FIG. 6 is a figure showing an example of a game screen including guidance images that are displayed on the basis of sequence data.

During game play, the dance command unit 25 shown in FIG. 4 sequentially reads in records included in the sequence data 25, and, on a predetermined cycle (for example at the frame rate of the display device 13), repeatedly generates and displays upon the display surface 13a of the display device 13 guidance images that command the player PL to perform dance actions according to those records. FIG. 6 shows an example of a game screen that includes a guidance image generated by the dance command unit 25. In more concrete terms, the example of FIG. 6 shows a game screen when a long step and a slide are commanded as play actions. The game screen 30 of FIG. 6 includes a guidance image 31 that is generated on the basis of the sequence data SD, an information image 32 that shows evaluation of the player PL and so on, and a background image 33 that renders the game. The guidance image 31 includes command marks 35 that command steps and so on described in the records of the sequence data SD, and a reference mark 36 that indicates the present time point in the game. The reference mark 36 is displayed as a band shaped image that extends in the transverse direction of the guidance image 31. The guidance image 31 issues a command to the player PL at the time point when he/she is to perform the action such as a step or the like, by the command marks 35 being shifted gradually within a predetermined shifting region 37 toward the reference mark 36 along with the progression of the musical piece, so that each of the command marks 35 overlaps the reference mark 36 at the time point that its corresponding action such as a step or the like is to be performed. The lengths of the command marks 35 vary according to the lengths of the time durations over which their actions should be continued. This feature is the same as the method for commanding operational timings such as time points of operations or the like in various per se known types of music games or dance games.

Figure 7:
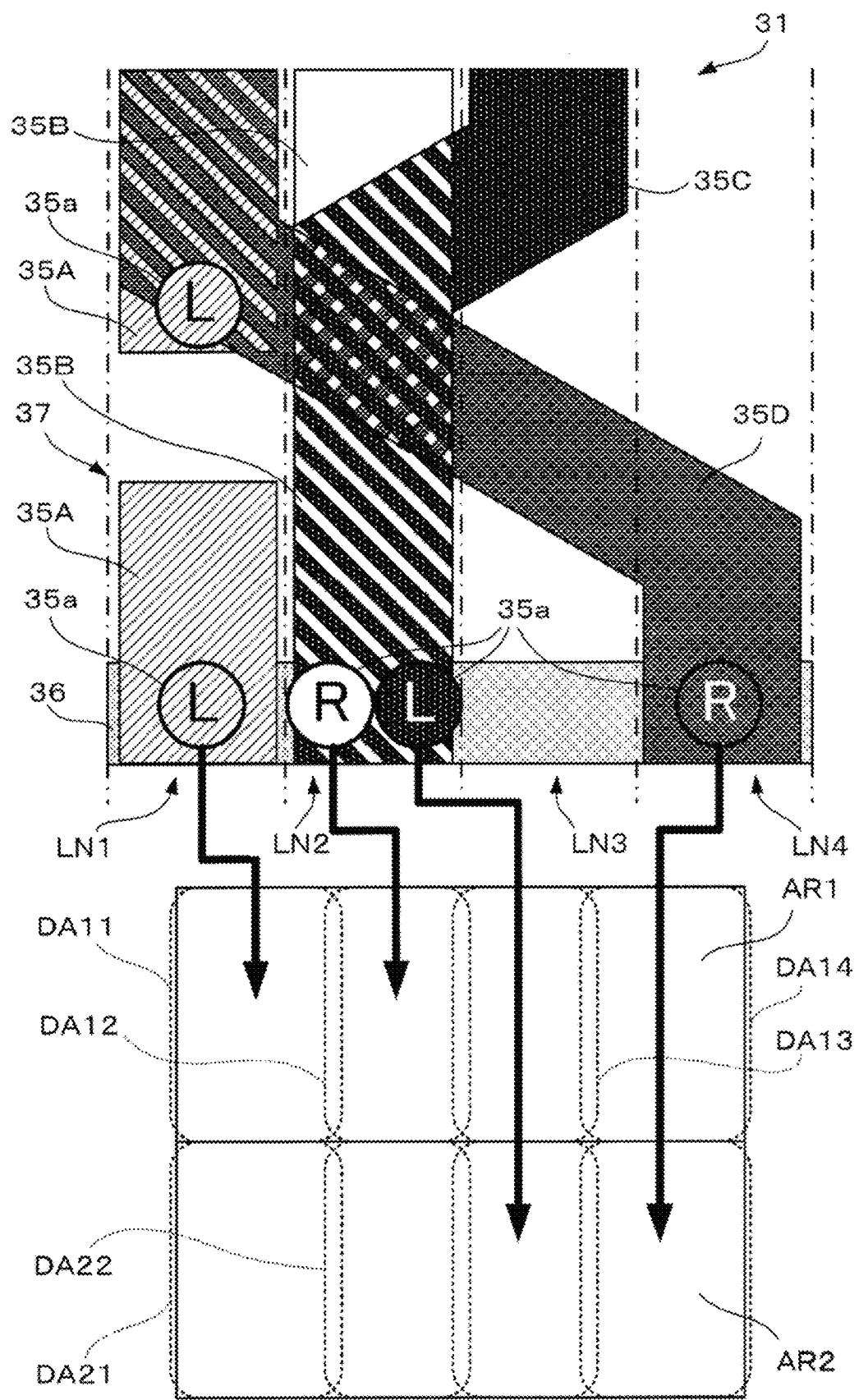
FIG. 7 is a figure showing an example of a correspondence relationship between the guidance image of FIG. 6 and determination regions that are set upon a treading surface of a stage.

In addition to indicating the time points for the actions described above and their continuous time intervals, it is also arranged for the guidance image 31 to indicate what type of step (including an action of his/her upper body half) the player PL should perform in which of the determination regions DA, according to the position of the command mark 35 in the transverse direction and according to the way in which the command mark 35 is displayed. In the following, the relationship between the command mark 35 and the step that the player PL should perform will be explained in concrete terms with reference to FIGS. 7 through 10. FIG. 7 shows an example of a correspondence relationship between the guidance image 31 and the determination regions DA upon the treading surface 11a. Incidentally, in FIG. 7, the shifting region 37 is shown in the state of being developed on the drawing paper. In the guidance image 31 of FIG. 6, in order for a sense of depth to be created, the shifting region 37 is displayed in a state so as appear at an angle, so that the upper edge of the shifting region is positioned further away from the viewer and its lower edge is positioned more toward the viewer. Moreover, in FIG. 7, the command marks 35 are shown with the subscripts A through D, so as to be distinguished from one another. FIG. 7 shows the correspondence relationship between the guidance image 31 and the determination regions DA, and the dimensional relationship shown in the figure is not necessarily the same as that of the actual game machine 3. For example, the determination regions DA are shown as being displayed in a state with certain gaps open between them and the inner periphery of the stage sensor 14, but it would be possible for them to be displayed in a state in which there are no gaps, in other words to be set to a state in which the outer periphery of the determination regions DA coincides with the inner periphery of the stage sensor 14. The vertical and horizontal dimensions of the treading surface 11a may be set as appropriate.

As is clear from FIG. 7, four lanes LN1 through LN4 (sometimes the term "LN" is employed as representative) are set in the shifting region 37, respectively matched to the four determination regions DA11 through DA14 and DA21 through DA24 in the transverse direction in each of the play regions AR1, AR2. The left end lane LN1 corresponds to the left end determination regions DA11, DA21. And the other lanes LN2 through LN4 respectively correspond to the determination regions DA12 through DA14 and DA22 through DA24 in order in the transverse direction. The command marks 35 are displayed in lanes LN corresponding to the determination regions DA specified by the step records RS. However, if the type of step is a slide, then its command mark 35 is displayed so as to be gradually displaced from the lane LN corresponding to the start position of the slide to the lane LN corresponding to its end position. In the example of FIG. 7, the command marks 35C, 35D correspond to a slide.

Furthermore, the command marks 35 are displayed while being visually differentiated, so that it is possible to distinguish to which of the play regions AR1, AR2 they correspond, and whether they correspond to the left foot or to the right foot of the player PL. While in FIG. 7 the command marks 35 are distinguished by differences in hatching, it would be possible to distinguish the command marks 35 by employing various visual factors, such as color, pattern, or the like. In other words, the positions in the transverse direction of the determination regions DA in which steps should be made are commanded by the positions in the transverse direction of the command marks 35. Furthermore, in which of the play regions AR1, AR2 the determination regions DA in which the steps that should be made are located, and which of the left foot or the right foot of the player should be employed for making the step, are commanded according to the visual factors such as the color, the pattern, or the like of the command marks 35. A command mark 35 that commands a step by the left foot does not necessarily need to be positioned toward the left side of the display surface 13a with respect to a command mark 35 that commands a step by the right foot in the same play region AR. In other words, it is also permitted for command marks 35 to be displayed so that the transverse direction of the stage 11 and the left and right relationship of the feet with which steps are to be made are reversed. By appropriately mixing commands of this type, it is possible to guide the player PL so as to perform steps while turning so that his/her back faces the display surface 13a.

An identification portion 35a is attached at the lower end portion of each command mark 35 for indicating to the player PL whether he/she should perform the step with the left foot or the right foot. For example, in the case of a command to perform the step with the left foot, the letter "L" is displayed in the identification portion 35a, and, in the case of a command to perform the step with the right foot, the letter "R" is displayed. In FIG. 7, a command mark 35 in which "L" or "R" is written as a black character corresponds to the play region AR1 on the front side, while a command mark 35 in which "L" or "R" is written as a white character corresponds to the play region AR2 on the rear side.

Figure 8:
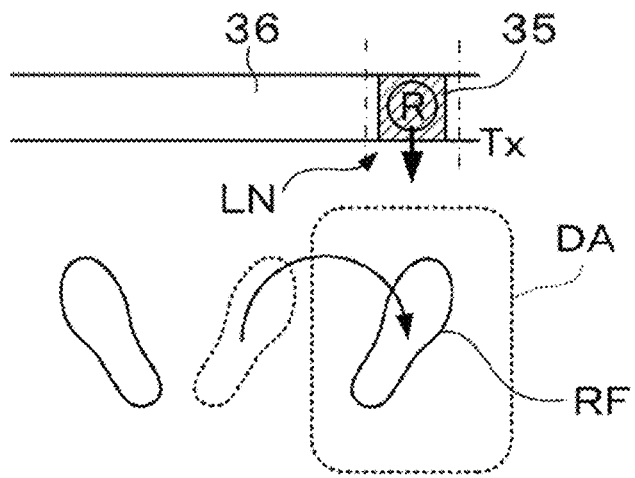
FIG. 8 is a figure showing an example of a correspondence relationship between a command mark corresponding to a short step and the step that the player should perform.
Figure 9:
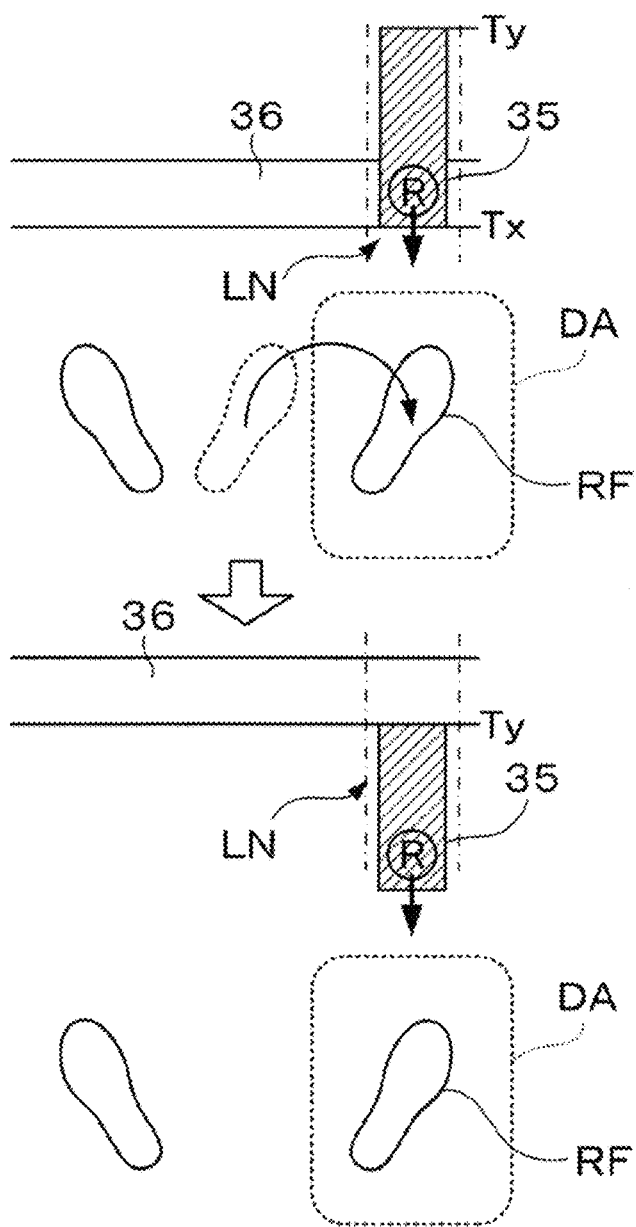
FIG. 9 is a figure showing an example of a correspondence relationship between a command mark corresponding to a long step and the step that the player should perform.
Figure 10:
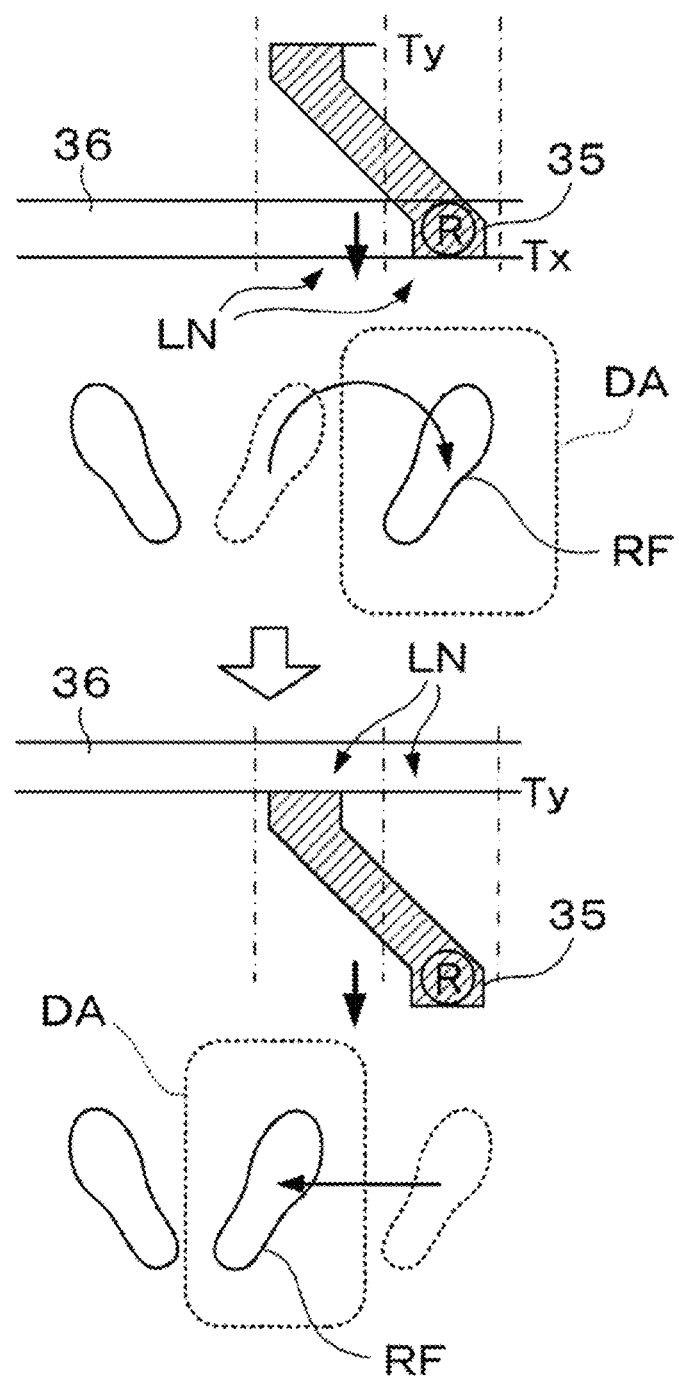
FIG. 10 is a figure showing an example of a correspondence relationship between a command mark corresponding to a slide and the step that the player should perform.

The command marks 35 change in length and in shape according to the type of step that they describe in the step record RS of the sequence data SD. For example, the command marks 35A, 35B correspond to long steps, whereas the command marks 35C, 35D correspond to slides. In the following, the relationship between the command marks 35 and the types of steps will be explained with reference to FIGS. 8 through 10. FIGS. 8 through 10 show examples in which steps by the right foot of the player are commanded for a determination region DA of either play region AR, among the front and rear play regions AR.

FIG. 8 shows an example of a correspondence relationship between a command mark 35 corresponding to a short step and the step that the player PL should perform. The command mark 35 that corresponds to a short step has a length approximately the same as that of the reference mark 36. In concrete terms, display of only an identification portion 35a may be employed as a short step command. In other words, the identification portion 35a may be formed to have approximately the same length as that of the reference mark 36. In this case, as indicated by the semicircular arrow sign, at the time point Tx that the command mark 35 overlaps the reference mark 36, the player PL should step down with his/her right foot RF upon the determination region DA corresponding to the lane LN that the command mark 35 is displaying, and should raise that foot before the command mark 35 passes through the reference mark 36.

FIG. 9 shows an example of a correspondence relationship between a command mark 35 corresponding to a long step and the step that the player PL should perform. The command mark 35 that corresponds to a long step has a length that is longer than that of the reference mark 36, and has a length that corresponds to the length of the time duration from the time point Tx that the step should start until the time point Ty that the step should be ended. In this case, as indicated by the semicircular arrow sign, at the time point Tx that the command mark 35 overlaps the reference mark 36, the player PL should step down with his/her right foot RF upon the determination region DA corresponding to the lane LN that the command mark 35 is displaying, and subsequently must continue stepping with his/her right foot RF upon that determination region DA until the time point Ty at which the command mark 35 passes the reference mark 36, and raise that right foot RF according to the time point of passage.

FIG. 10 shows an example of a correspondence relationship between a command mark 35 corresponding to a slide and the step that the player PL should perform. The command mark 35 corresponding to the slide has a length that is longer than that of the reference mark 36, and has a length that corresponds to the length of the time duration from the time point Tx that the step should start until the time point Ty that the step should be ended. Furthermore, the command mark 35 corresponding to the slide is displayed so as to move gradually from the lane LN corresponding to the determination region DA where the slide should be started to the determination region DA where the slide should be ended. In response to a command of this type, as shown by the semicircular arrow sign, at the time point Tx that the command mark 35 overlaps the reference mark 36, the player PL should step down with his/her right foot RF upon the determination region DA corresponding to the lane LN displayed by the command mark 35, and subsequently, in accordance with change of the determination region DA, must make his/her right foot slide over the treading surface 11*a* as shown by the straight arrow sign, and, along with completing shifting of the right foot RF to the final determination region DA by the time point Ty in which the command mark 35 passes the reference mark 36, also must raise his/her right foot RF from the final determination region AD according to the time point of passage.

As described above, the time point that the player PL should perform the step, the length of the time duration that the step should be continued, the determination region DA in which the step should be performed, and the foot with which the step should be performed are commanded by employing the position of the command mark 35 in the guidance image 31 in the vertical direction and in the transverse direction, and visual factors such as the color and the pattern and so on of the command mark 35 and letters or the like displayed in the identification portion 35*a*. The dance command unit 25 of FIG. 4 reads in those records, among the records described in the sequence data SD, that specify time points in a range of a predetermined time duration from the present time point into the future (as one example, a time duration corresponding to two bars of the musical piece); determines the position, the display mode, the letters in the identification portion, and so on of the command marks 35 according to the information described in those records; and displays the command marks 35 in the guidance image 31 according to these details that have thus been determined.

According to the structure described above, it is possible to specify and to select, in the step record RS, at least one of the determination regions DA11 through DA14 and DA21 through DA24 as the determination region DA where the step should be performed. Accordingly, it is possible to command steps of various types for each of the front and rear play regions AR1, AR2 while distinguishing between the play regions AR1, AR2. For example, it is possible to command the players PL1, PL2 who are arranged longitudinally to perform the same step, or mutually different steps, while they are cooperating or collaborating with one another. Due to this, it is possible to guide the players PL so that they can perform complex and highly expressive steps. For example, it is possible to guide the players PL so as to show dance-specific performances, such as movements in which the front and rear players PL1, PL2 move so as to change their positions alternatingly between left and right, or movements taking steps in which the front and rear players PL are mutually correlated so that, for example, the player PL2 at the rear moves left and right and performs steps taking the player PL1 at the front as an axis. Accordingly, it is possible to enhance the interest of the dance game.

Moreover, the timing at which the foot of the player PL should leave the treading surface 11*a*, in other words the timing at which the action is changed from the contacting state in which the foot of the player is touching the treading surface 11*a* to the non-contacting state in which the foot does not touch the treading surface, is advised, and the timing at which the player PL actually lifts up his/her foot is evaluated on the basis of this timing. Due to this, it is possible to cause the player PL to execute actions that cause change from the state in which his/her foot is stepping at an appropriate timing as a play action until the state in which the foot is raised (i.e. actions after he/she has stepped upon the treading surface 11*a* until subsequently he/she removes his/her foot). In other words, it is possible to perform guidance so that the player PL executes the action of lifting up his/her foot at an appropriate position and at an appropriate timing. As a result, it is possible to guide the performance by the player PL toward a more beautiful dance. And, due to the above, it is possible further to enhance the interest level of the game.

Incidentally, as will be clear from FIGS. 6 and 7, since the lanes LN are shared by the front and rear play regions AR1, AR2, accordingly sometimes it may happen that at least some of the command marks 35 for each of the play regions AR are overlapped upon the same lane LN. Moreover, since a command mark 35 that commands a slide is displayed so as to cross diagonally between several lanes LN, accordingly sometimes it may also happen that it is overlapped with other command marks 35. In an overlapped portion of this type, the command marks 35 are displayed in a mixed manner so that the players PL are able to recognize each of the command marks 35. In the example of FIGS. 6 and 7, the command marks 35B, 35C are overlapped on the lane LN2 from its lower end portion to its middle, and moreover the command mark 35D extends from the rightmost lane LN4 to the leftmost lane LN1 so as to cross the overlapped portions of those command marks 35B, 35C. In each of these overlapped portions, the display of the command marks 35 is controlled so that the visual elements of each command mark 35, such as its unique color, pattern, and so on, appear alternatingly in various ways, such as in the form of zigzags, stripes, lattices, and so on.

In the above description, a case has been explained in which a movement by the lower body half of the player PL has been commanded as a dance step; but, with this game machine 3, it would also be possible to command the player PL via the guidance image 31, as play actions, to perform actions of various types that constitute a dance, other than actions of making steps (i.e. actions in which he/she moves his/her lower body half). For example, the player PL may be commanded to perform a jump upward from the treading surface 11*a*. When a jump is commanded, the information in the step record RS specifying the foot with which the player should take a step and the information specifying the determination region DA may be empty information items having no values (the same holds for a crouching action or a diving under movement). It is possible to distinguish whether or not the player PL has jumped from the output signals of the light reception portions 14*c* of the stage sensor 14. In other words if, from the state in which the foot of the player PL is being detected at some position in the play region AR that is specified for the jump, a change of all of the light reception portions 14*c* to the ON signal state is detected, in other words if that foot is not detected, then it may be considered that the player PL has jumped. Furthermore, via the guidance image 31, it would also be possible to command the player PL to perform some action other than the action of moving his/her foot, for example to perform a crouching action or a squatting movement. It is possible to determine whether or not an operation of this type has been performed on the basis of the video from the camera 17, for example. In this case, the camera 17 functions as an example of the detection device of the present invention.

Figure 11:
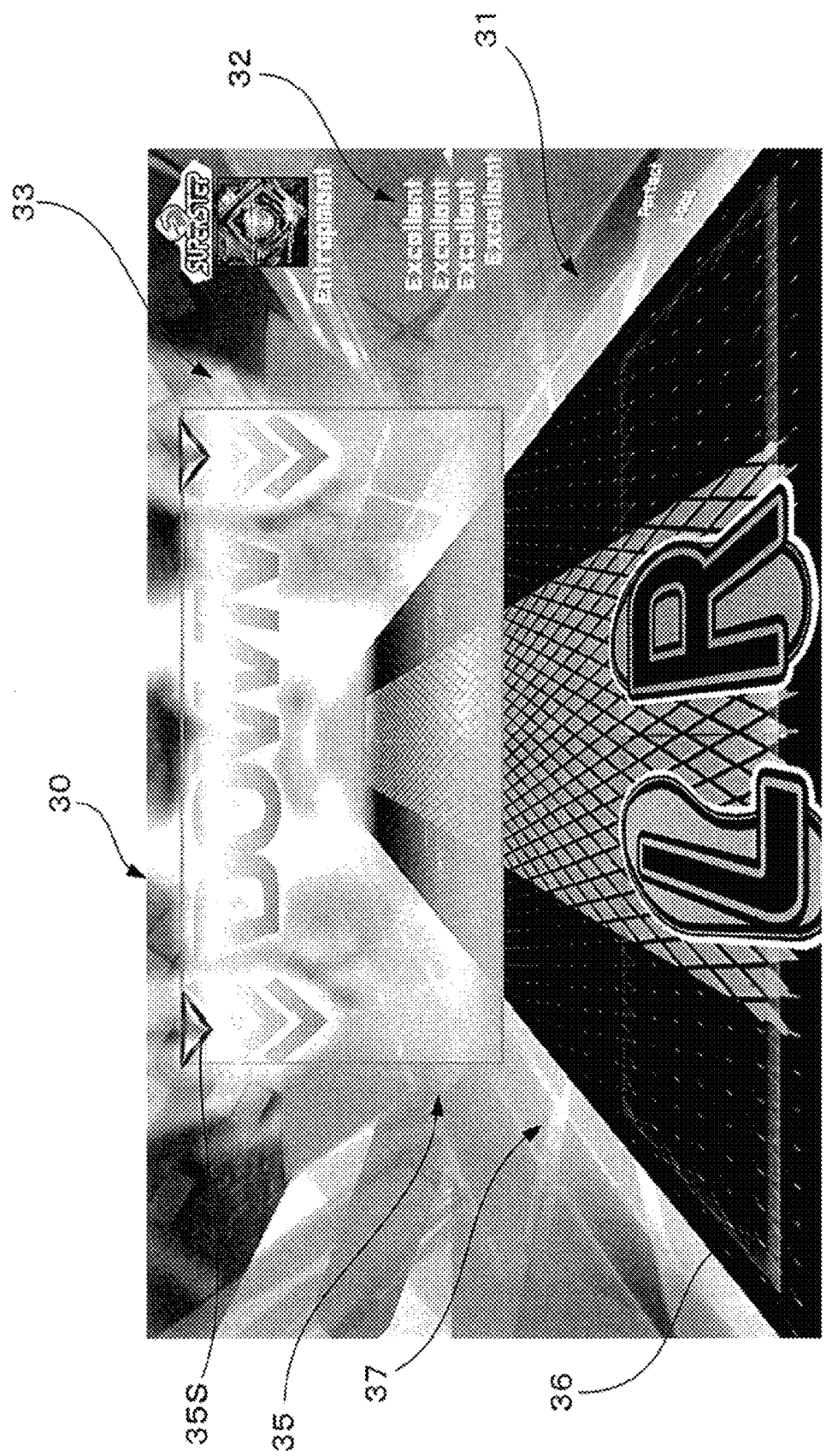
FIG. 11 is a figure showing an example of a game screen when a crouching action is being commanded.

FIG. 11 shows an example of a game screen 30 when a crouching action is commanded as a play action. In this case, as shown in FIG. 11, as a command mark 35, the guidance image 31 includes a crouching action command mark 35S that commands crouching action. Moreover, this command mark 35S includes the letters "DOWN", so as to prompt the player PL to perform a crouching action. Furthermore, the timing for the crouching action, in other words the timing at which the action of shifting the upper body half of the player downward, is advised by a crouching action command mark 35S of this type by arriving at the reference mark 36. In this case, together with the command mark 35S arriving at the reference mark 36, the player PL is requested to perform a crouching action, in other words to perform the action of lowering his/her upper body half by a certain amount.

Figure 12:
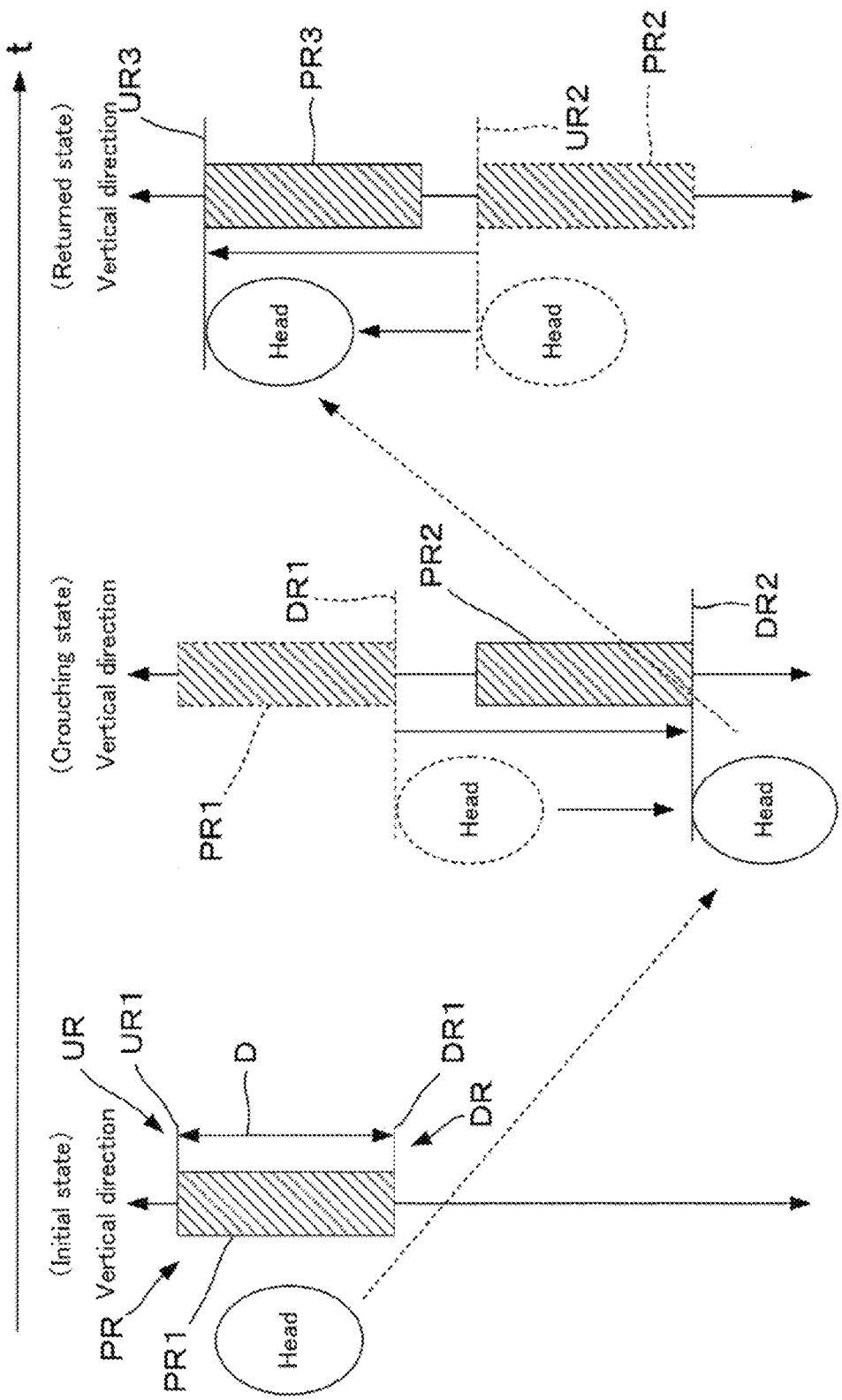
FIG. 12 is an explanatory figure for explanation of a method for detecting a crouching action.

FIG. 12 is an explanatory figure for explanation of the way in which a crouching action is detected. The example of FIG. 12 shows in time series shifting of the head of the player (by the broken line arrow sign) when crouching action is determined, with shifting of his/her head up and down being taken as reference. Furthermore, the example of FIG. 12 shows a diving under movement by the player until his/her head (upper body half) returns to the position of the original attitude after the crouching action has been executed. As shown in FIG. 12, a diving under movement includes, in order, the initial state, the crouching state (i.e. the state in which the player is in the crouched attitude), and the returned state (the state of the original attitude). And the crouching action is defined by the change from the initial state to the crouched state. On the other hand, the return movement is defined by the change from the crouching action to the returned state. In these states, a predetermined range PR (a so called play range) is set for permitting some movement of the player PL in the vertical direction. In this predetermined range PR, an upper limit position UR (i.e. a boundary position on the upward side) and a lower limit position DR (i.e. a boundary position on the downward side) are set, so as to define a constant width D in the vertical direction. Moreover, the position of this predetermined range PR changes so as to vary in the vertical direction according to the upward and downward motion of the player PL, while keeping the same width D in the vertical direction.

In concrete terms, the initial state is a state in which the position of the apex of the player PL is located within the predetermined range PR (sometimes hereinafter this is termed the "initial range PR1") which is set by taking as reference the position of the apex that is measured at the start of play. The position of the apex of the player is the site on the player PL at the highest position (generally at the top of his/her head). The position of the apex is specified on the basis of photography by the camera 17. The initial range PR1 is set so as to define a fixed width D in the vertical direction, taking this position of the apex as reference. Due to this, an upper limit position UR (hereinafter sometimes termed the "initial upper limit position UR1") and an lower limit position DR (hereinafter sometimes termed the "initial lower limit position DR1") of the predetermined range PR are both set to positions of a predetermined width from the position of the apex of the player, so that the lower one becomes larger than the upper one. And the initial state is maintained while the head of the player PL is positioned in this type of initial range PR1. In other words, even if the position of the head of the player changes within the initial range PR1, it is not determined that the crouching action has been performed. In this case, the downward direction and the crouching action respectively function as examples of the predetermined direction and the shifting action of the present invention. Moreover, the initial lower limit position DR1 functions as one example of the threshold position and the boundary position toward a predetermined direction of the present invention. The width D that defines the predetermined range PR may be set as appropriate. For example, a predetermined range D of this sort may be around 10 cm. In a similar manner, the predetermined range PR is not limited to a format in which, the lower is set to be greater than the upper, taking the position of the apex as reference. For example, as the predetermined range PR, a range may be employed in which the upper is set to be greater than the lower, taking the position of the apex as reference; or, alternatively, ranges that are set to the same vertical width may be employed. In concrete terms, a predetermined range PR of this sort may have an upper limit position UR and a lower limit position DR at positions of equal width of 5 cm below and above the top of the head.

Incidentally, the specification of the position of the apex may be performed by various methods. For example, it would also be possible for, not the site that is positioned highest on the player PL, but rather the head of the player PL, to be specified as the position of the apex on the basis of the result of photography by the camera 17. Furthermore, it would also be acceptable for the average value of the highest positions during a predetermined time interval (for example, from when the payment for playing is inserted to the start of actual play) to be specified as the position of the apex of the player. Yet further, in this case, it would also be possible for the average value, after the highest value and the lowest value (i.e. irregular vertical values) among the calculated values that are calculated as the highest positions have been eliminated, to be specified as the position of the apex. In these cases, it is possible to prevent irregular (outlier) positions due to the player raising his/her hand or the like from being specified as the position of the apex.

On the other hand, the crouching state is a state in which the head of the player (i.e. his/her position apex) has been shifted to be lower than the initial lower limit position DR1 of the initial range PR1 in the initial state. In other words, in the initial state, it is determined that a crouching action has been performed when an action has been executed to lower the head of the player below the initial lower limit position DR1 of the initial range PR1. Furthermore, along with the crouching action, the initial range PR1 is also shifted downward, while maintaining its width D, so as to bring down the initial lower limit position DR1. In more concrete terms, when the head of the player has shifted downward from the position of the broken line, along with the shifting downward of his/her apex position, the position of the apex is pulled downward so as to extend the initial lower limit position DR1 downward, and the lower range PR2 is arranged above the head of the player so that the lower limit position DR (hereinafter this is sometimes referred to as the downward lower limit position DR2) of the predetermined range PR after shifting (hereinafter this is sometimes referred to as the downward range PR2) and the position of the apex agree with one another. And the crouched state is maintained while the head of the player is positioned within this downward range PR2. In other words, it is not determined that a return movement has been executed, even if the position of the head of the player changes within the downward range PR2. Incidentally, provided that the upper body half of the player is in the state of being lower than a certain level, the crouched state may correspond to states of various types, such as the upper body half being inclined forward or backward or to the left or the right, or being lowered. In other words, actions of various types may be employed as crouching actions, such as a simple crouching operation, a backward bending operation, a bowing operation, or the like.

The returned state is a state in which the head of the player (i.e. the position of the apex) has shifted further upward from the crouched state than the upper limit position UR of the downward range PR2 (in the following, sometimes this is termed the "downward upper limit position UR2"). In other words, it is determined that a return movement has been executed when, in the crouched state, an action has been executed to raise the head of the player higher than the upper limit position UR2 of the downward range PR2. Moreover, along with the return movement, the downward range PR2 also shifts upward while maintaining the width D, so as further to push the downward upper limit position UR2 upward. In more concrete terms, when the head of the player has shifted upward from the position shown by the broken line, along with the position of the apex moving upward, the position of the apex rises upward so as to push the downward upper limit position UR2 upward, and the range PR is arranged below the position of the apex, so that the upper limit position UR (hereinafter, this is sometimes termed the "returned upper limit position UR3") of the predetermined range PR after shifting (hereinafter this is sometimes termed the "returned range PR3") coincides with the position of the apex. As a result, if the top portion of the head of the player at the same height functions as the position of the apex, the returned upper limit position UR3 is set to a lower position than the initial upper limit position UR1. In other words, the position of the returned range PR3 not only is different from the position of the downward range PR2, but also is different from the position of the initial range PR1. Even if the position of the head of the player changes in this returned range PR3, it is not determined that a return movement has been performed, and the returned state is still maintained as before. And, subsequently, it is determined whether or not a crouching action has been performed by taking the returned state as reference, instead of the initial state. Due to this, subsequently the action of crouching is determined upon, according as to whether or not the position of the apex has been lowered below the lower limit position DR of the returned range PR3. In other words, along with the crouching action, the position of the head of the player returns to a position similar to the initial state, but the position of the predetermined range PR that is set with reference to this head is corrected. As one example, whether or not crouching action and diving under movement have been executed may be determined in this manner. In this case, the upward direction functions as an example of the opposite direction of the present invention. Furthermore, the downward upper limit position UR2 functions as an example of the other position of the present invention and the boundary position after movement on the opposite side of the present invention. In a similar manner, the lower limit position DR of the returned range PR3 functions as the further other position of the present invention and as the boundary position after movement in the predetermined direction of the present invention. Moreover, the movement range of the head of the player shown by the solid line arrow sign functions as an example of the movement range of the present invention.

Figure 13:
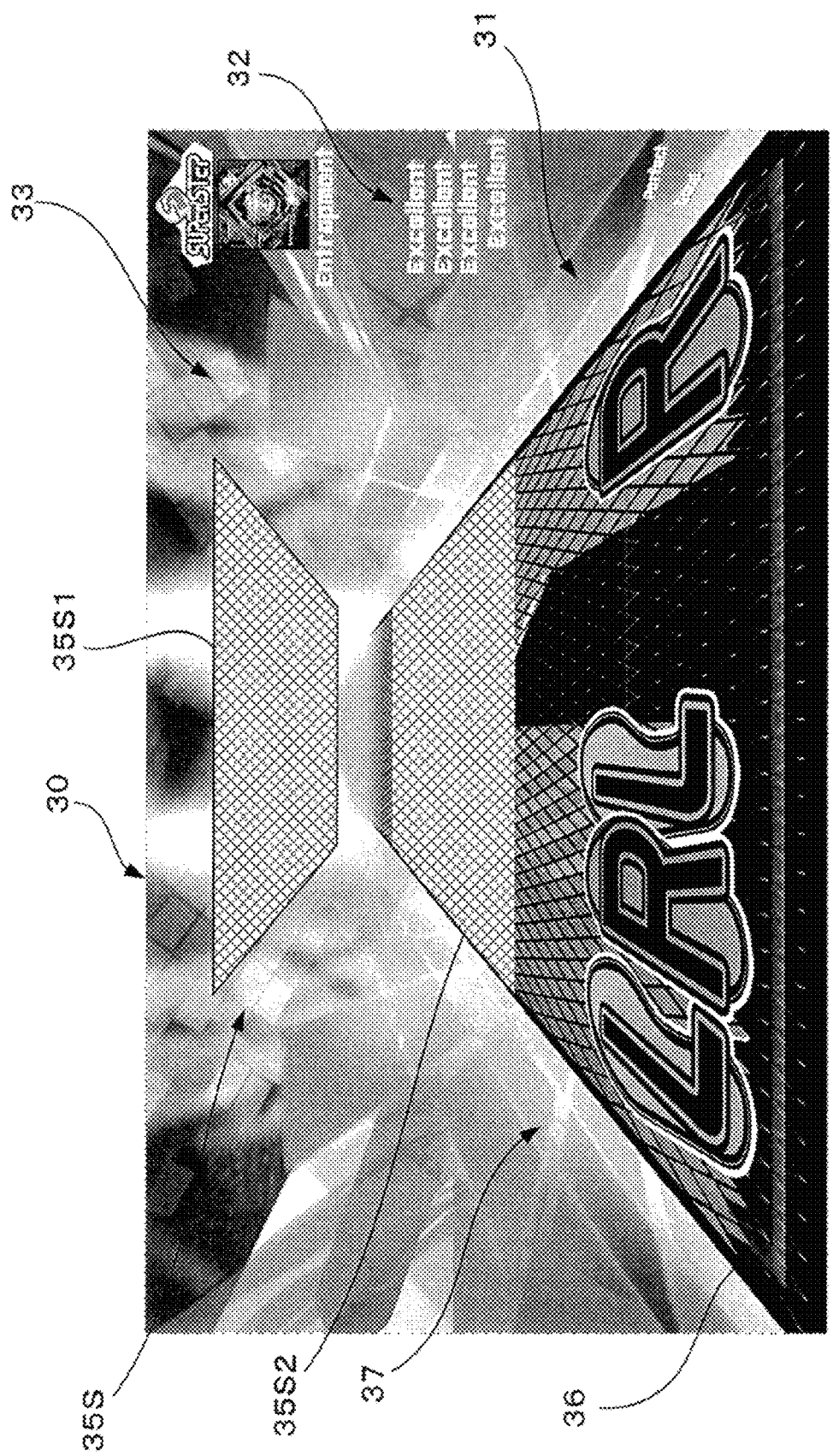
FIG. 13 is a figure showing an example of a game screen when a crouching action in which the crouched state is maintained for a predetermined time interval is being commanded.

FIG. 13 shows an example of the game screen 30 when a crouching action is commanded so that the crouched state should be maintained for a predetermined time interval. In this case, as shown in FIG. 13, a crouching action command mark 35S is formed so as to extend rearward (i.e. opposite to the reference mark 36 in the depth direction). Moreover, the crouching action command mark 35S may include an upper side command mark 35S1 and a lower side command mark 35S2. The upper side command mark 35S1 commands the player PL to perform a crouching action (or this could also be a diving under movement). Due to this, as described above, in response to the upper side command mark 35S1 arriving at the reference mark 36, the player PL is ordered to crouch down so that his/her head is lowered below the lower limit position DR of the initial range PR1 or of the returned range PR3. The time interval that this crouched state should be maintained is commanded by the length in the depth direction of the upper side command mark 35S1. In other words, the player PL is requested to maintain the crouched state until the end portion of the upper side command mark 35S1 in the depth direction passes the reference mark 36. Moreover, when the return movement is evaluated, the player PL is requested to perform the return movement at the timing that the end of the upper side command mark 35S1 passes the reference mark 36. The upper side command mark 35S1 is disposed above the shifting region 37, so as to induce the crouching action.

On the other hand, the lower side command mark 35S2 functions as a shadow of the upper side command mark 35S1, projected upon the shifting region 37. In other words, the lower side command mark 35S2 shifts along with the upper side command mark 35S1, so as to show the position of the upper side command mark 35S1 on the shifting region 37. As described above, the upper side command mark 35S1 is positioned above the shifting region 37, and is separate from the shifting region 37. Due to this, it is difficult for the player PL to ascertain the timing of arrival at the reference mark 36 only from the upper side command mark 35S1 (i.e., the feeling of distance between the upper side command mark 35S1 and the reference mark 36). Accordingly, the lower side command mark 35S2 is displayed in order to assist the player in ascertaining this type of arrival timing and so on. And, by displaying crouching action command marks 35S of these types upon the guidance image 31, the dance command unit 25 functions as an example of an advisory device.

Figure 14:
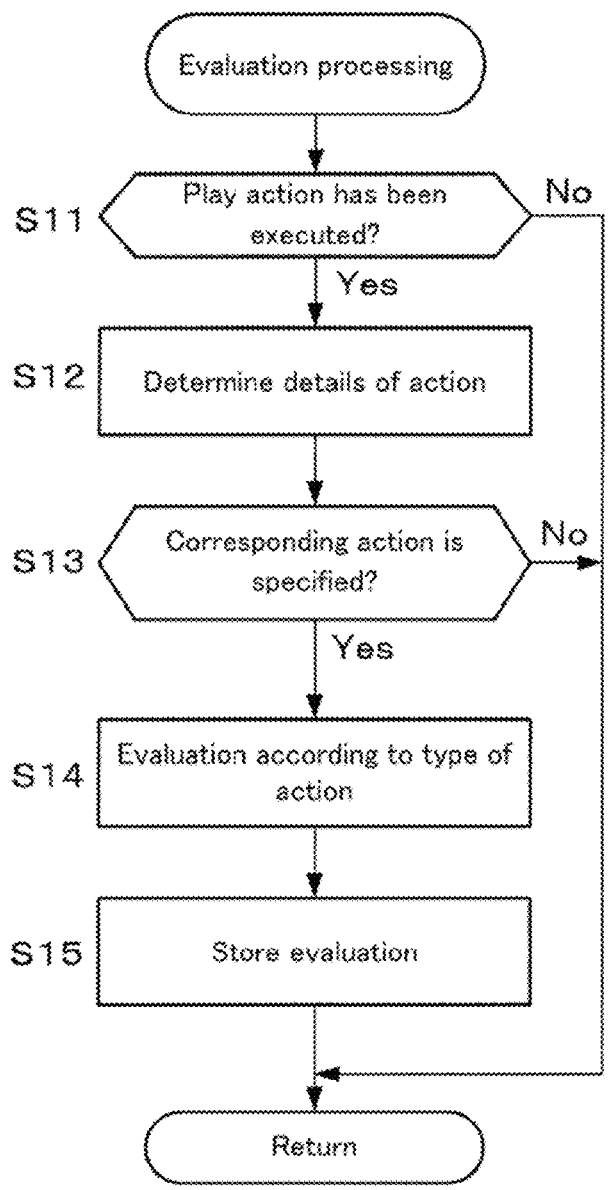
FIG. 14 is a flow chart showing an example of evaluation processing executed by a dance evaluation unit.

Next, an example of the evaluation processing that is performed by the dance evaluation unit 26 in order to evaluate a player PL will be explained with reference to FIG. 14. The processing of FIG. 14 is repeatedly executed on a predetermined cycle, and, by executing this evaluation processing, the dance evaluation unit 26 functions as an example of an evaluation device. When the processing of FIG. 14 starts, the dance evaluation unit 26 determines whether or not a play action has been executed. As described above, play actions include both actions of the lower body half of the player (i.e. actions to step upon the treading surface 11a and so on) and actions of his/her upper body half (crouching actions and so on). In order to determine whether or not an action of the lower body half of the player has been performed as a play action, the dance evaluation unit 26 determines whether or not a change of the output signal of any of the light reception portions 14c of the stage sensor 14 from OFF to ON has been detected (step S11). This determination is for determining whether or not the player PL has raised (i.e. has removed) his/her foot from the position where it was stepping upon the treading surface 11a. If no change of the output signals of the light reception portions 14c is detected, then the dance evaluation unit 26 terminates this iteration of the evaluation processing.

Furthermore, the dance evaluation unit 26 refers to the output signal of the camera 17 in order to determine whether or not an action of the upper body half of the player has been performed as a play action. In concrete terms, on the basis of the output signal from the camera 17, the dance evaluation unit 26 determines that a play action is being executed if the position of the apex of the player PL (for example his/her head) has, in the initial state or in the returned state, been shifted below the lower limit position DR of the predetermined range PR, and determines that play action is not being executed if shifting past the lower limit position DR is not occurring. And the dance evaluation unit 26 terminates this iteration of the evaluation processing if play action is not being executed. Incidentally, a return action may be included in the upper body half movements as a play action. In this case, it is determined that a play action has been executed if, in the crouched state, the position of the apex of the player PL has shifted above the upper limit position UR of the predetermined range PR. The return movement may be evaluated independently from the crouching action, or may be evaluated in series with the crouching action (i.e. as a set) as a diving under movement. Moreover, in the following, sometimes the lower limit position DR or the upper limit position UR that serves as a reference for this type of determination may be termed the "threshold position".

On the other hand, when change of the output signals from the light reception portions 14c or the like is detected, i.e. when a play action is executed, the dance evaluation unit 26 determines the details of this action (step S12). In concrete terms, when a movement of the lower body half of the player is executed as a play action, then the dance evaluation unit 26 determines the time point of detection and the position of detection by the stage sensor. In this case, the determination of the position of detection may be performed by determining the determination region DA corresponding to the light reception portion or portions 14c that have detected change from OFF to ON. The determination region DA that has been detected in this manner is the actual position where the player PL is treading. On the other hand, when a movement of the upper body half of the player is executed as a play action, the dance evaluation unit 26 determines the time point that this movement of his/her upper body half has occurred (i.e. the time point when the position of the apex exceeds the threshold position) and the direction of movement (i.e. whether it was a shift toward the crouching state, or a shift away from the crouching state).

Next, the dance evaluation unit 26 determines whether or not the action corresponding to the time point determined in step S12 or the like is specified in the sequence data SD (step S13). In concrete terms, in the case of an action by the lower body half of the player, the dance evaluation unit 26 may determine whether or not a time point within a predetermined evaluation range with respect to the time point that has been detected is specified in the sequence data SD, and moreover whether or not a step record RS in which the same determination region DA as the actual treading position is included therein. On the other hand, in the case of an action by the upper body half of the player, the dance evaluation unit 26 may determine whether or not the time point that has been detected is specified, and moreover whether or not a step record RS in which an operation that corresponds to the direction of movement (a crouching action or a return action) is specified is included in the sequence data SD. If an affirmative decision is reached in step S13, then the dance evaluation unit 26 evaluates the step by the player PL according to the type of step (action) designated by the step record RS (step S14). In the case of a movement by the lower body half of the player, the evaluation in step S14 is performed separately for each of the play regions AR.

Evaluation according to the type of step may, for example, be performed as follows. If a short step is specified in the step record RS, then it is determined that the short step has succeeded if the amount of deviation between the time point of detection determined in step S12 and the time point specified in the step record RS is within a predetermined permitted range. It would also be possible to evaluate the step higher, the smaller is the amount of deviation. In the case of a short step, if the output signal from the light reception portion 14c corresponding to the specified determination region DA has changed from OFF to ON within the permitted range for the time point that was specified, then that will suffice for it to be determined that the step that was specified has been executed. If a change of this sort is detected, then, even if an OFF signal is outputted continuously after the command mark 35 that commands the short step has passed the reference mark 36, still this may be processed as not exerting any influence upon the evaluation.

If a long step or a slide are specified in the step record RS, then not only should the time point and the position of the step be evaluated, but also the time interval that it continues. In concrete terms, the past output signals from the light reception portions 14c of the stage sensor 14 are acquired (it may be arranged to store them for a predetermined interval), it is determined whether or not the player PL has stepped upon the same determination region DA of the treading surface 11a continuously from the permitted range with respect to the start time point of the long step specified in the step record RS to a time point within the permitted range with respect to the end time point, and, if it can be confirmed that he/she has thus stepped continuously, then it is determined that the long step has succeeded. It would also be possible for the step to be evaluated to be higher, the smaller are the amounts of deviation of the start time point and the end time point of the step. But if the player PL has raised his/her foot or the like before the time point reaches the permitted range with respect to the end time point and the output signals from all of the light reception portions 14c of the same determination region DA have changed to ON, then it is determined that the long step has failed.

Furthermore, if a slide is specified in the step record RS, then the output signals in the past of the light reception portions 14c of the stage sensor 14 are acquired, and it is determined whether or not, from the permitted range with respect to the start time point of the slide specified in the step record RS to the time point within the permitted range with respect to the end time point, the player PL continues to step upon the treading surface 11a, and moreover it is determined whether or not the determination region DA has changed from the determination region DA at the start of the slide to the determination region DA at the end of the slide. It is determined that the slide has succeeded if it has been possible to confirm those actions. It is also possible to evaluate the step as being higher (i.e. better), the smaller are the amounts of deviation of both the start time point of the slide and its end time point. And it is determined that the slide has failed if the player PL raises his/her foot or the like before arriving at a time point within the permitted range with respect to the end time point so that the output signals from the light reception portions 14c of the determination region DA that is designated as being the subject of the slide all have changed to ON. Furthermore, it is determined that the slide has failed if it has not been possible to confirm change of the detected position from the determination region DA at the start of the slide to the determination region DA at the end of the slide.

On the other hand, if a crouching action or a return movement is designated by the step record RS as the type of step, then it is determined that the crouching action or the return movement (this could also be a diving under movement) has succeeded if the amount of deviation between the time point that the action of the upper body half of the player has actually been executed (i.e. the time point of detection in step S12) and the time point designated in the step record RS is within a predetermined range. It would also be acceptable to provide a higher evaluation for the movement of the upper body half of the player, the smaller is this amount of deviation. Even if the amount of deviation of the time points is within the range that can be evaluated, if the direction of movement does not match, as when a return movement is executed in response to a command for a crouching action or the like, then it is determined that the play action has failed.

After the stepping by the player PL has been evaluated in step S14, the dance evaluation unit 26 stores the result of evaluation in step S14 in the internal memory of the control unit 20, or in the storage device 21 (step S15), and then this iteration of the evaluation processing is terminated. But if in step S13 it has been determined that there is no command for a corresponding step, then the dance evaluation unit 26 skips steps S14 and S15 and this iteration of the evaluation processing is terminated. In other words, if some action other than the designated action is executed as a play action, such as a step other than the designated step being performed, or the like, then that action is not evaluated by the evaluation processing of FIG. 11. Accordingly, even if the player PL steps upon the treading surface 11a in a position that is different from the determination region DA commanded by the command mark 35, this action is ignored by the dance evaluation unit 26 and does not exert any influence upon the evaluation.

In the processing of FIG. 14, in the case of an action by the lower body half of the player, the processing of step S12 and subsequently is executed upon the condition that the output signal of any one of the light reception portions 14c of the stage sensor 14 has changed from OFF to ON. Accordingly, in response to a command for a step via the guidance image 31, it is necessary for the player PL to raise his/her foot once from the treading surface 11a. However, the evaluation processing by the dance evaluation unit 26 is not limited to this example of evaluating movement of the lower body half of the player when triggered by a change of the output signals of the light reception portions 14c from OFF to ON. For example, it would also be possible to take change from ON to OFF as a trigger, and to evaluate the timing of going ON in this OFF position. And, if a jump is specified as a type of step, then it will be possible to perform determination by matching whether on not the output signals from all of the light reception portions 14c in the play region AR that is specified for this jump have become ON, to the time point that the jump is specified.

Incidentally, in the processing of FIG. 14, when a movement of the lower body half of the player is evaluated, no determination is made as to with which of his/her left foot and right foot the player PL is stepping upon the determination region DA. In other words, even though the foot with which stepping should be performed is specified in the guidance image 31, whether or not the player PL has stepped with that foot that has been specified is outside the subjects for evaluation. Accordingly, for example, even if the player PL has stepped down with his left foot upon a command mark 35 for which the right foot was designated, if the time point of that step and its position match the command in the step record RS, then this step by the player PL is evaluated to have been appropriate. However, it would also be possible to detect whether the step has been performed with the left foot or the right foot, and to add to the subjects of evaluation whether or not the step has been performed with the foot on the side specified in the command. If the resolving power of the stage sensor 14 is sufficiently high, it is possible to distinguish between the right foot and the left foot on the basis of the pattern in which the stage sensor 14 is detecting a foot, in other words on the basis of what is the distribution of the light reception portions 14c that are outputting ON signals and the light reception portions 14c that are outputting OFF signals. Alternatively, it would also be possible to determine the orientation of at least a part of the body of the player PL (for example, the orientation of his/her lower body half or of his/her face) on the basis of the video of the player PL photographed by the camera 17, and to distinguish between his/her left foot and his/her right foot on the basis of the result of that determination. And it would be possible to distinguish between his/her left foot and his/her right foot by combining his/her orientation determined by the video from the camera 17 and the status of detection by the stage sensor 14. Of course, other than employing the stage sensor 14 or the camera 17, it would also be possible to employ a sensor of some type that is capable of distinguishing between the left foot of the player and his/her right foot.

Furthermore, in the processing of FIG. 14, even when two players PL1, PL2 are playing, it is not determined which of the players PL has performed a step. Accordingly, even if the player PL on the front side steps on one of the determination regions DA21 through DA24 on the rear side or if conversely the player PL2 on the rear side steps on one of the determination regions DA11 through DA14 on the front side, if the time point and the position of this step match, then it is determined that stepping has been performed in an appropriate manner. Accordingly, it is also possible for two players PL1, PL2 to play at dancing while helping one another. Alternatively, a single player PL may be permitted to play so as to cover both of the front and rear play regions AR1, AR2. Yet further, by allowing a sufficient clearance on the treading surface 11a of the stage 11, it is possible to permit a plurality of players PL to perform steps of a dance in at least one of the play regions AR.

As is clear from the above explanation, the play regions AR are regions that are set as ranges in which at least one player PL is to perform steps of a dance. It is possible logically to determine which range is set as one play region by comparing the width of the play region with the command for the step given via the display device 13. In other words since, in the embodiment described above, steps are commanded by taking the four determination regions DA11 through DA14 on the front side as one unit, and steps are commanded by taking the four determination regions DA21 through DA24 on the rear side as another unit, accordingly it is possible to consider the play regions AR each as a unit for those commands. And those play regions AR may be set so that their positions deviate with respect to the longitudinal direction. In the embodiment described above a plurality of determination regions DA are set in the transverse direction for one play region AR by varying their transverse positions, but it is possible to guide the player PL to perform steps forward and backward in a single play region AR by setting a plurality of determination regions DA in the longitudinal direction within that single play region AR, and by varying the treading position commands in the longitudinal direction as appropriate. In this case, the player PL can be directed to perform steps forward, backward, leftward, and rightward within the play regions AR that are displaced forward and backward, so that it is possible to guide the player PL so as to provide a dance having higher performability. The number of determination regions DA in the transverse direction is not limited to being four; it may be varied as appropriate. Moreover, it is also possible to vary the number of play regions AR in the longitudinal direction as appropriate.

Figure 15:
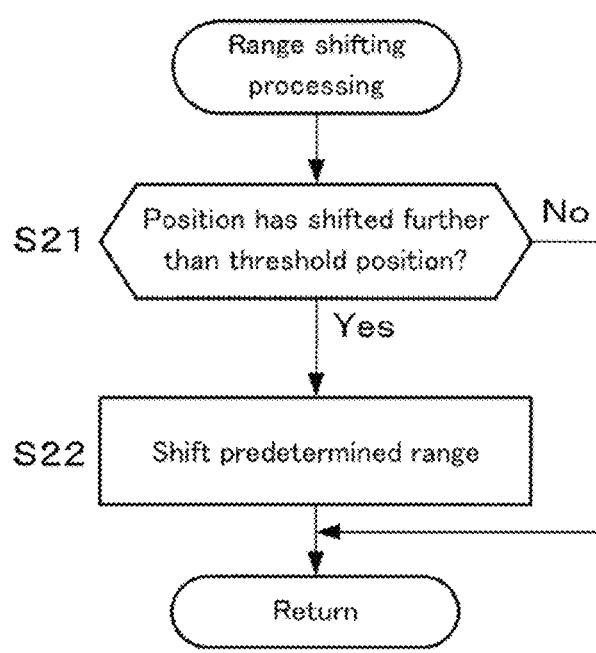
FIG. 15 is a flow chart showing an example of range shifting processing executed by the dance evaluation unit.

Next, referring to FIG. 15, an example will be explained of range shifting processing that is performed by the dance evaluation unit 26 in order to shift the predetermined range PR for determination of whether or not a crouching action or the like is executed along with movement of the upper body half of the player. The processing of FIG. 15 is executed each time movement of the position of the apex of the player in the vertical direction is determined on the basis of the output signal from the camera 17. Moreover, by executing this range shifting processing, the dance evaluation unit 26 functions as an example of a position change device. When the processing of FIG. 15 starts, the dance evaluation unit 26 determines whether or not, as a movement of the upper body half of the player, the position of his/her apex has shifted further than a threshold position (step S21). In concrete terms, as described above, the dance evaluation unit 26 determines, in the initial state and in the returned state, whether or not the apex position has shifted below the lower limit position DR (i.e. the threshold position) of the predetermined range PR, or, in the crouching state, whether or not the apex position has shifted above the upper limit position UR (i.e. the threshold position) of the predetermined range PR. If this determination result is negative, in other words if the position of the apex of the player has not shifted past the threshold position, then the dance evaluation unit 26 skips the subsequent processing and terminates this iteration of the range shifting processing.

On the other hand, if the result of the determination in step S21 is affirmative, then the dance evaluation unit 26 shifts the current position of the predetermined range PR (step S22). In concrete terms, when a crouching action is being executed, accompanying this crouching action, the dance evaluation unit 26 shifts the predetermined range PR so that the lower limit position of the predetermined range PR is shifted downward along with the position of the apex of the player. On the other hand, when a return movement is being executed, accompanying this return movement, the dance evaluation unit 26 shifts the predetermined range PR so that the upper limit position UR of the predetermined range is shifted upward along with the position of the apex of the player. And, after the predetermined range has been shifted, the dance evaluation unit 26 terminates this iteration of the range shifting processing.

According to the structure described above, a crouching action or a return movement to shift the position of the apex of the player PL (generally his/her head) in the vertical direction so that it moves past the threshold position is commanded via the crouching action command mark 35S, and these movements are evaluated according to their actual performance timings. In other words, a movement of the head of the player PL is commanded as a play action, and is evaluated. Due to this, it is possible to employ a head movement of this type as a play action. In concrete terms, as described above, it is possible to employ a crouching action, a return movement, or a diving under movement in which these are combined (a series of movements from the start of a crouching action to a return to the original attitude) or the like as play actions, and to request the player PL to perform these actions. Moreover, for example, if in the diving under movement a command is issued to maintain the crouched attitude, then it is also possible to employ the time period that this type of crouched attitude is to be maintained (in which the attitude is maintained until returning to the original attitude) as a play action. Since, due to the above, it is possible to employ more diverse actions as play actions, accordingly it is possible to request the player PL to perform a more complicated dance or the like, as compared to the case when it is not possible to employ actions of this type as play actions. As a result, it is possible to enhance the level of interest of the game.

Furthermore, the position of the predetermined range PR for permission of the up and down motion of the player PL is changed along with the crouching action. Due to this, it is possible to correct the threshold position by using the play action. Moreover, since it is possible to reflect the actual movement of the player PL in the threshold position after the movement, accordingly it is possible to set the threshold position after movement in a more appropriate manner, as compared to when the threshold position after movement is determined in advance.

The present invention is not limited to the embodiment described above; it may be varied or changed as appropriate. For example while, in the embodiment described above, a plurality of determination regions AD were fixedly set in each of the play regions AR1, AR2, it would also be possible to set the determination regions AD so that they can change dynamically. For example, the arrangement of the determination regions DA may change as appropriate while the game is being played. Furthermore, the sizes of the determination regions DA may also change in an appropriate manner. For example, it could be arranged for the sizes of the determination regions DA to change according to the degree of difficulty that is set for the game, or according to the level of the player PL, his/her skill, or the like. As one example, the higher is the degree of difficulty, the level of the player PL or the like, by narrowing down the determination regions DA, it may be arranged to perform the evaluation related to the suitability of the positions where the player PL makes his steps more stringently. In that case, the widths of the command marks 35 in the transverse direction may be changed according to change of the size of the determination regions DA in the transverse direction. Furthermore, it is not necessarily required to set the lanes LN in which the command marks 35 move to be fixed. For example it is possible to change the range in the transverse direction of the determination regions DA dynamically by taking the positions of the command marks 35 in the transverse direction as reference by, along with omitting the setting of the lanes LN and specifying in the sequence data SD the positions in the transverse direction where the command marks 35 are to be displayed in association with the positions in the transverse direction of the light reception portions 14c, also specifying what type of ranges in the transverse direction of the light reception portions 14c are to be set as determination regions DA by taking their commanded positions as reference. If a plurality of determination regions DA are set in each of the play regions AR in the longitudinal direction, and the player PL is commanded to take steps in the longitudinal direction, then the determination regions DA may also be changed dynamically in the longitudinal direction.

In the embodiment described above it was arranged to evaluate steps separately for each of the play regions AR1, AR2, but it would also be possible not to distinguish the play regions AR1, AR2, but to determine whether the determination region DA that is designated and the determination region DA in which the step is actually detected match or do not match, only in relation to the transverse direction. For example if, in a case in which a step is commanded for the left edge determination region DA11 of the play region AR1 at the front, a step has been detected in the left edge determination region DA21 of the play region AR2 at the rear, then this may be considered as being a case in which the commanded treading position and the actual treading position agree with one another. In conclusion, provided that steps are commanded for each of the play regions AR so that the treading position changes in an appropriate manner for each of the front and rear play regions AR1, AR2, it is possible to guide the plurality of players PL at the front and rear so that they execute complex and highly expressive steps while they cooperate or collaborate together, and thereby it is possible to enhance the interest of the game.

While the dance command unit 25 serves as one example of an advisory device, and commands the time points and the positions of steps and so on by relatively shifting the command marks 35 and the reference mark 36 in predetermined directions within the guidance image 31, the advisory device is not limited to this type of example. For example, the advisory device may be built so as to present an image in which a predetermined character is dancing as a guidance image, so that the player performs dance steps according to this image. Moreover, in the embodiment described above, the shifting region 37 of the guidance image 31 was shared between the front and rear play regions AR1, AR2, but it would also be possible to provide a structure in which, by displaying images commanding steps or the like for each play region in mutually different areas upon the display device, the step command device commands steps or the like while distinguishing between the play regions.

In the embodiment described above, in the case of two-player play, playing was performed by allocating the front and rear determination regions DA to the two players PL respectively. However, the present invention is not limited to this sort of format. For example, if a plurality of people are playing, then a plurality of regions in the transverse direction may be allocated to the plurality of players respectively. In this case, for example, commands for movements of the upper body halves of the players, such as crouching actions and so on, may be issued for each region. In other words, a command may be issued for only the player in charge of the region on the left side to perform a crouching action. And it may be determined whether or not a crouching action has been performed in this region on the left side. Furthermore, the above described music game (i.e. timing game) may be performed by a single player.

In the embodiment described above, a stage sensor 14 that employed infrared rays was employed, but this is not limitative; provided that it is possible to detect the actual treading position of the player PL, sensors of various types may be employed for detecting movements of his/her lower body half. For example, it may be arranged to detect his/her actual treading position via the camera 17. Alternatively, it may be arranged to detect the position where the player is treading by disposing load sensors or the like upon the treading surface 11*a*. Furthermore, the movement of the upper body half of the player is not limited to being shifting (action) of his/her head (apex position). For example, movements of various types of various sites upon the upper body half of the player may be employed as play actions, such as moving the entire upper body half to left and right (movements of the entire body that accompany movements of the lower body half could also be employed), or spreading out both arms to the left and the right, or simply shaking one hand (or both hands) to the left or the right, or the like. Yet further, the target for detection of movement above the threshold position is not limited to being the upper body half of the player. For example, the action of spreading out both legs to the left and to the right, or the action of lifting up one leg and shaking it to left and right from the knee, or the like may also be employed as play actions. In other words, actions of various types in which various parts of the body of the player are moved may be employed as play actions. Predetermined directions in which various body parts should be moved may also be set as appropriate, according to the various parts. Also, depending upon the sites on the subject of movement and the predetermined direction, a specified position that is appropriate, such as an end portion of the site in the predetermined direction or the like, may be employed as reference for setting of the predetermined range PR, instead of the position of the apex. Moreover, the detection device is not limited to being the camera 17; devices of various types may be employed as detection devices, provided that they are capable of detecting actions of the above type.

In the embodiment described above, the upper limit position UR or the lower limit position DR of the predetermined range PR is employed as the threshold position. And, by pressing the lower limit position downward and so on, the upper limit position UR is also shifted. In other words, the threshold positions before shifting and the threshold positions after shifting are related via the predetermined range PR. However, the present invention is not limited to this format. For example, the predetermined range PR may be omitted, and only a threshold position in the downward direction (for example, in the initial state, the lower limit position DR) or only a threshold position in the upward direction (for example, in the crouched state, the upper limit position UR) may be employed as a threshold position. Furthermore, the present invention is not limited to a structure in which the threshold position after movement is set in conjunction with the range of movement of the player PL. For example, it would be possible for the threshold positions before and after movement (for example threshold positions in the vertical direction) to be set fixedly in advance, and for these fixed threshold positions to be changed according to whether or not the player PL performs certain actions.

In the embodiment described above, as one example of an evaluation device, the dance evaluation unit 26 evaluated the player PL by comparing together the time points and the positions (i.e. the determination regions DA) of steps commanded by the dance command unit 25 and the time points and the positions of the actual steps detected by the stage sensor 14; but various changes would be possible as appropriate, provided that the evaluation device can evaluate the player PL on the basis of comparison between the status of the steps that are commanded and the detected statuses of the steps that are actually performed. For example, the evaluation device may be adapted to compare together the time points of the steps that are commanded and the time points of the steps that are actually detected, and to evaluate the player PL irrespective of whether or not their positions agree with one another. The same also holds for other play actions.

In the following, various aspects of the present invention are explained that are deduced from the embodiments and variant embodiments described above. Incidentally, in order to facilitate understanding of the present invention, reference symbols in parentheses that refer to the attached figures are appended in the following explanation, but the present invention is not thereby to be considered as being limited to the embodiments shown in the figures.

The game machine of the present invention is a game machine (3) comprising a computer (20) that provides a performance timing game in which an advised timing at which a play action is to be executed is advised, and that, when the play action is actually executed, evaluates an actual performance timing of the play action on the basis of the performance timing, wherein the computer serves as: a detection device (17) that detects a shifting action (for example, a crouching action) in which at least a part of the body of a player (for example, his/her head) is shifted in a predetermined direction (for example, the downward direction) past a threshold position (DR, UR); an advisory device (25) that, as the performance timing, advises a timing at which the shifting action is to be executed, so that the shifting action functions as the play action; and an evaluation device (26) that, when the shifting action has been detected via the detection device, evaluates an actual timing at which the shifting action has been executed as the actual advised timing.

According to the present invention, the action of shifting at least the part of the body of the player past the threshold position in the predetermined direction is commanded, and this actual performance timing is evaluated. In other words, the movement of at least the part of the body of the player is commanded as a play action, and is evaluated. Since, due to this, it is possible to employ a movement of this sort as a play action, accordingly it is possible to enhance the level of interest of the game.

The threshold position could be fixed, or could be variable. For example, as an aspect of the game machine of the present invention, an aspect may be employed in which there is further provided a position change device (26) that, when the shifting action has actually been executed, changes the threshold position (DR1) to an other position (UR2) in the predetermined direction. Due to this, it is possible to correct the threshold position by taking advantage of the play action.

In an aspect of the game machine of the present invention: the detection device may further detect a return movement that returns the part of the body in the direction opposite to the predetermined direction (for example, in the upward direction) further than the other position; the advisory device may further advise a timing at which the return movement is to be executed as the performance timing, so that the return movement further functions as the play action; if the return movement has been detected by the detection device, the evaluation device may further evaluate an actual timing at which the return movement has been executed as the actual performance timing; and the position change device may shift the other position to a further other position in the opposite direction (the lower limit position DR of the returned range PR). In this case, it is possible to employ the series of operations from the start of an action until returning to the original attitude as play actions. Moreover, in this aspect, the advisory device may further advise an operating interval from the shifting action until the return movement; and the evaluation device may further evaluate an actual interval from the shifting action until the return movement on the basis of the operating interval. In this case, it is possible to employ maintenance of the attitude until return to the original attitude as a play action. Due to the above, it is possible to employ a greater variety of actions as play actions.

When the threshold position changes, its position after change may be determined in advance, or may be determined according to parameters of various types or the like. Moreover, for example, the action of shifting a part of the body of the player may be employed as a parameter of this sort. In other words, the threshold position after change may be determined according to the play action. In concrete terms, for example, in an aspect of the game machine of the present invention, the position change device may set at least one of the other position and the further other position according to a movement range of the shifting action or of the return movement. In this case, it is possible to reflect the actual action by the player in the threshold position after change. As a result, it is possible to set the threshold position after change in a more appropriate manner, as compared to the case in which it is determined in advance.

The threshold positions before and after change may be set so as to be mutually correlated, or may not be mutually correlated. For example, in an aspect of the game machine of the present invention, the detection device may detect an operation of shifting the part of the body further in the predetermined direction than the threshold position as the shifting action, so that a boundary position towards the predetermined direction (DR) of a predetermined range (PR) defined in the predetermined direction functions as the threshold position, and the position change device may change the threshold position to the other position by shifting the predetermined range in the predetermined direction, so that a boundary position (UR2) after movement on the opposite side to the predetermined direction functions as the other position. Moreover, in this aspect, the detection device may detect an action to shift the part of the body in the return direction further than the boundary position after movement on the opposite side (UR2) as the return movement, and the position change device may change the other position to the further other position by further shifting the predetermined range after shifting (PR2) in the return direction, so that another boundary position after movement in the predetermined direction (the lower limit position DR of the returned range PR), which is different from the boundary position towards the predetermined direction (DR1), functions as the further other position.

Directions of various types, such as upward, downward, leftward, rightward, slantingly, and so on may be employed as the predetermined direction in which the play action is to be performed. And, for example, shifting of sites on the body of the player of various types that are associated with predetermined directions of these types may be employed as the subjects of play actions. For example, in an aspect of the game machine of the present invention, either vertical direction may be employed as the predetermined direction, and the head of the player may be employed as the part of the body of the player.

On the other hand, a non-transitory computer readable storage medium according to the present invention is a non-transitory computer readable storage medium storing a computer program that is adapted to cause the computer (20) connected to the detection device to function as devices of the game machine described above. By the computer program of the present invention being executed, the game machine of the present invention can be implemented.

The invention claimed is:

1. A game machine comprising a computer that provides a timing game in which a performance timing at which a play action is to be executed is advised, and that, when the play action is actually executed, evaluates an actual performance timing of the play action on the basis of the performance timing, and wherein the computer serves as:
 a detection device that detects a shifting action in which at least a part of the body of a player is shifted in a predetermined direction past a first threshold position;
 an advisory device that, as the performance timing, advises a timing at which the shifting action is to be executed, so that the shifting action functions as a play action;
 an evaluation device that, when the shifting action has been detected via the detection device, evaluates an actual timing at which the shifting action has been executed as the actual performance timing; and
 a position change device that, when the shifting action has actually been executed, shifts the first threshold position to a second threshold position in the predetermined direction that is different from the first threshold position.

2. The game machine according to claim 1, wherein:
the detection device further detects a return movement that returns the part of body in an opposite direction to the predetermined direction farther than the second threshold position;
the advisory device further advises a timing at which the return movement is to be executed as the performance timing, so that the return movement further functions as the play action;
when the return movement has been detected by the detection device, the evaluation device further evaluates an actual timing at which the return movement has been executed as the actual performance timing; and
the position change device shifts the second threshold position to a third threshold position in the opposite direction.

3. The game machine according to claim 2, wherein:
the advisory device further advises an operating interval from the shifting action until the return movement; and
the evaluation device further evaluates an actual interval from the shifting action until the return movement on the basis of the operating interval.

4. The game machine according to claim 2, wherein the position change device sets at least one of the second threshold position and the third threshold position according to a movement range of the shifting action or of the return movement.

5. The game machine according to claim 4, wherein:
the detection device detects an operation of shifting the part of the body farther in the predetermined direction than the first threshold position as the shifting action, so that a first boundary position towards the predetermined direction of a predetermined range defined in the predetermined direction functions as the first threshold position; and
the position change device shifts the first threshold position to the second threshold position by shifting the predetermined range in the predetermined direction, so that a second boundary position after movement on an opposite side to the predetermined direction functions as the second threshold position.

6. The game machine according to claim 5, wherein:
the detection device detects an action to shift the part of the body in the return direction further than the second boundary position after movement on the opposite side as the return movement; and
the position change device shifts the second threshold position to the third threshold position by shifting the predetermined range farther after shifting in the return direction, so that a third boundary position after movement in the predetermined direction, which is different from the second boundary position towards the predetermined direction, functions as the third threshold position.

7. The game machine according to claim 1, wherein the predetermined direction comprises a vertical direction, and
the part of the body of the player comprises a head of the player.

8. A non-transitory computer readable storage medium storing a computer program that, when executed by a computer, causes the computer to perform operations comprising:
advising a timing at which a shifting action is to be executed in a timing game, so that the shifting action functions as a play action in the timing game;
detecting, by a detection device, a shifting action in which at least a part of a body of a player is shifted in a predetermined direction past a first threshold position;
when the shifting action has been detected by the detection device, evaluating an actual timing at which the shifting action has been executed as an actual performance timing; and
when the shifting action has actually been executed, shifting the first threshold position to a second threshold position in the predetermined direction that is different from the first threshold position.

9. The computer readable storage medium according to claim 8, wherein the operations further comprise:
advising a timing at which a return movement is to be executed that returns the part of body in an opposite direction opposite to the predetermined direction farther than the second threshold position;
detecting, by the detection device, the return movement;
in response to the return movement being detected, evaluating an actual timing at which the return movement has been executed; and
shifting the second threshold position to a third threshold position in the opposite direction.

10. The computer readable storage medium according to claim 9, wherein the operations further comprise:
advising an operating interval from the shifting action until the return movement; and
evaluating an actual interval from the shifting action until the return movement on the basis of the operating interval.

11. The computer readable storage medium according to claim 9, wherein at least one of the second threshold position and the third threshold position is set according to a movement range of the shifting action or of the return movement.

12. The computer readable storage medium according to claim 11, wherein the operations further comprise:
detecting, by the detection device, an operation of shifting the part of the body farther in the predetermined direction than the first threshold position as the shifting action, so that a first boundary position towards the predetermined direction of a predetermined range defined in the predetermined direction functions as the first threshold position; and
shifting the first threshold position to the second threshold position by shifting the predetermined range in the predetermined direction, so that a second boundary position after a movement on an opposite side of the predetermined range from the predetermined direction functions as the second threshold position.

13. The computer readable storage medium according to claim 12, wherein the operations further comprise:
detecting, by the detection device, an action to shift the part of the body in the return direction farther than the second boundary position after the movement as the return movement; and
shifting the second threshold position to the third threshold position by shifting the predetermined range after shifting in the return direction, so that a third boundary position after movement in the predetermined direction, which is different from the second boundary position, functions as the third threshold position.

14. The computer readable storage medium according to claim 8, wherein the predetermined direction comprises a vertical direction, and
the part of the body of the player comprises a head of the player.

15. A non-transitory computer readable storage medium storing a computer program that, when executed by a computer, causes the computer to perform operations comprising:

indicating, on a display coupled to the computer, a shift timing at which a shifting action is to be executed in a timing game;

detecting, by a camera coupled to the computer, a shifting action in which at least a part of a body of a player is shifted in a predetermined direction past a first threshold position;

in response to detecting the shifting action, evaluating an actual timing at which the shifting action has been executed, based on the advised shift timing, and shifting the first threshold position to a second threshold position in the predetermined direction that is different than the first threshold position.

16. The computer readable storage medium according to claim 15, wherein the operations further comprise:

indicating, on the display, a return timing at which a return movement is to be executed that returns the part of body in an opposite direction opposite to the predetermined direction farther than the second threshold position;

detecting, by the camera, the return movement;

in response to the return movement being detected, evaluating an actual timing at which the return movement has been executed; and shifting the second threshold position to a third threshold position in the opposite direction.

17. The computer readable storage medium according to claim 16, wherein the operations further comprise:

indicating an operating interval from the shifting action until the return movement; and evaluating an actual interval from the shifting action until the return movement on the basis of the operating interval, the detected shift action and the detected return movement.

18. The computer readable storage medium according to claim 16, wherein at least one of the second threshold position and the third threshold position is set according to a movement range of the shifting action or of the return movement.

19. The computer readable storage medium according to claim 15, wherein the operations further comprise:

detecting, by the camera, an operation of shifting the part of the body farther in the predetermined direction than the first threshold position as the shifting action, so that a first boundary position towards the predetermined direction of a predetermined range defined in the predetermined direction functions as the first threshold position; and shifting the first threshold position to the second threshold position by shifting the predetermined range farther in the predetermined direction, so that a second boundary position after a movement on an opposite side of the predetermined range from the predetermined direction functions as the second threshold position.

20. The computer readable storage medium according to claim 15, wherein the predetermined direction is a vertical direction, and the part of the body of the player is a head of the player.

\* \* \* \* \*